United States Patent
Chatani et al.

(10) Patent No.: US 9,390,301 B2
(45) Date of Patent: *Jul. 12, 2016

(54) USER GROUPING APPARATUS AND METHODS BASED ON COLLECTED WIRELESS IDS IN ASSOCIATION WITH LOCATION AND TIME

(71) Applicants: Sony Corporation, Tokyo (JP); Sony Computer Entertainment Inc., Tokyo (JP)

(72) Inventors: Masayuki Chatani, Tokyo (JP); Chisato Numaoka, Kanagawa (JP)

(73) Assignees: Sony Corporation, Tokyo (JP); Sony Interactive Entertainment Inc., Tokyo (JP)

( * ) Notice: Subject to any disclaimer, the term of this patent is extended or adjusted under 35 U.S.C. 154(b) by 225 days.

This patent is subject to a terminal disclaimer.

(21) Appl. No.: 14/026,125

(22) Filed: Sep. 13, 2013

(65) Prior Publication Data

US 2014/0015646 A1    Jan. 16, 2014

Related U.S. Application Data

(63) Continuation of application No. 12/446,779, filed as application No. PCT/JP2007/000748 on Jul. 10, 2007, now Pat. No. 8,564,415.

(30) Foreign Application Priority Data

Oct. 30, 2006    (JP) .................................. 2006-293882

(51) Int. Cl.
*G06K 7/10*    (2006.01)
*G06Q 30/02*    (2012.01)
(Continued)

(52) U.S. Cl.
CPC ............ *G06K 7/10366* (2013.01); *G06Q 30/02* (2013.01); *G06Q 30/0201* (2013.01); *G06Q 30/0601* (2013.01); *H04W 4/008* (2013.01); *H04W 4/028* (2013.01)

(58) Field of Classification Search
CPC ... G06K 7/10366; G06Q 10/08; G06Q 30/02; G06Q 30/0201; G06Q 30/0601; H04L 67/18; H04W 4/008; H04W 4/02; H04W 4/028
USPC ........................... 340/10.1, 572.1; 455/456.1; 707/E17.018
See application file for complete search history.

(56) References Cited

U.S. PATENT DOCUMENTS 5,519,861 A *  5/1996  Ryu et al.
6,845,241 B2    1/2005  Edlund et al.
(Continued)

FOREIGN PATENT DOCUMENTS

JP    2001350782 A    12/2001
JP    2002268593 A    9/2002
(Continued)

OTHER PUBLICATIONS

Office Action for corresponding JP Application No. 2006-293882, dated Aug. 9, 2011.
(Continued)

*Primary Examiner* — Fekadeselassie Girma
*Assistant Examiner* — Stephen Burgdorf
(74) *Attorney, Agent, or Firm* — Matthew B. Dernier, Esq.

(57) ABSTRACT

An RFID aggregate storage stores a radio-frequency ID aggregate structure. The RFID aggregate structure is an aggregated data structure of a plurality of RFIDs, in which each RFID is associated with a location and time read out from a RFID tag, and RFID related information, hierarchically constructed by classifying RFIDs based on the readout location and further by classifying them based on the readout time. A proximity evaluator evaluates the proximity between the first user's RF ID aggregate and the second user's RFID aggregate. A user classifier classifies the first user and the second user in one group when the proximity is smaller than a predetermined threshold value.

6 Claims, 20 Drawing Sheets

(51) Int. Cl.
*G06Q 30/06* (2012.01)
*H04W 4/00* (2009.01)
*H04W 4/02* (2009.01)

(56) References Cited

U.S. PATENT DOCUMENTS

| | | |
|---|---|---|
| 7,817,038 B2 | 10/2010 | Torning |
| 2001/0013009 A1 | 8/2001 | Greening et al. |
| 2002/0165758 A1 | 11/2002 | Hind et al. |
| 2003/0087652 A1* | 5/2003 | Simon et al. ............... 455/466 |
| 2003/0154278 A1 | 8/2003 | Hirschman et al. |
| 2005/0177614 A1 | 8/2005 | Bourne |
| 2006/0074888 A1 | 4/2006 | Tamura |
| 2006/0109083 A1 | 5/2006 | Rathus et al. |
| 2006/0179056 A1 | 8/2006 | Rosenberg |
| 2006/0206621 A1 | 9/2006 | Toebes et al. |
| 2007/0082659 A1* | 4/2007 | Nevalainen ............... 455/418 |
| 2007/0090951 A1 | 4/2007 | Chan et al. |
| 2007/0106721 A1 | 5/2007 | Schloter |
| 2007/0260716 A1 | 11/2007 | Gnanasambandam et al. |
| 2008/0054072 A1 | 3/2008 | Katragadda et al. |

FOREIGN PATENT DOCUMENTS

| | | |
|---|---|---|
| JP | 2003347991 A | 12/2003 |
| JP | 2005250703 A | 9/2005 |
| JP | 200648443 A | 2/2006 |
| JP | 2006107020 A | 4/2006 |
| JP | 2006260311 A | 9/2006 |

OTHER PUBLICATIONS

Written Opinion for corresponding Japanese patent application PCT/JP2007/000748, Oct. 23, 2007.
International Preliminary Report on Patentability for corresponding Japanese patent application PCT/JP2007/000748, Feb. 13, 2009.
International Search Report for corresponding Japanese patent application PCT/JP2007/000748, Oct. 23, 2007.

* cited by examiner

FIG.5

```
void On()
{
        // WHEN POWER IS ON, CREATE A THREAD TO EXECUTE ScanTag() FOR SCANNING A TAG
        TagScan = Create_Thread(Scan_Tag);
        TagInfoUpdate = Create_Thread(Update_Tag_Info);
} void Off()
{
        // WHEN POWER IS TURNED OFF, END THE TAG SCAN THREAD
        Destroy_Thread(TagScan);
        Destroy_Thread(TagInfoUpdate);
} void Scan_Tag()
{
        // RECORD THE DETECTED TAG WITH TIME AND LOCATION INFORMATION
        While(TRUE) { //    CONTINUOUS LOOP
                if ((tagID = Get_Tag()) == TRUE) { // IF THERE IS A TAG
                        loc = Get_Location(); // OBTAIN LOCATION INFORMATION
                        Time = Get_Time(); // OBTAIN TIME INFORMATION
                        Record_Tag(tagID,Loc,Time); // RECORD THE TAG IN ASSOCIATION WITH LOCATION AND TIME
                } // TAG MUST BE REGISTERED WITH NO OVERLAP
        }
}
```

FIG.8

```
Void Update_Tag_Info()
{
        if ((ch = Network_Connection_Available(server)) != NULL)
        {       // TRY TO CONNECT TO A SERVER VIA NETWORK.
                // IF SUCCEED, CHANNEL ID IS RETURNED TO CH.
                // IF NOT, NULL IS RETURNED.
                Get_Metadata_For_Tags(ch);
                        //      ACQUIRE ATTRIBUTE INFORMATION RELATED TO TAGS ACCUMULATED
                        //      IN THE MEMORY FROM THE SERVER VIA CHANNEL.
                        //      WRITE IT IN "ATTRIBUTE INFORMATION" OF EACH TAG STRUCTURE. FURTHER,
                        //      WRITE INFORMATION, SUCH AS PRESENT TIME AND "UPDATED", IN "UPDATE
                        //      INFORMATION". DEPENDING ON THE IMPLEMENTATION, USING THIS "UPDATED"
                        //      INFORMATION, SKIP THE NEXT ATTRIBUTE INFORMATION ACQUISITION
                        //      PROCESSING FOR RECENTLY UPDATED TAGS.
                Get_Metadata_For_Locations(ch);
                        //      FOR LOCATIONS, DO PROCESSING IN A SIMILAR WAY AS DONE FOR "TAGS."
        }
}
```

USER GROUPING APPARATUS AND METHODS BASED ON COLLECTED WIRELESS IDS IN ASSOCIATION WITH LOCATION AND TIME

CROSS REFERENCE TO RELATED APPLICATIONS

This is a continuation application claiming priority to U.S. patent application Ser. No. 12/446,779, filed Jul. 1, 2009, the entire disclosure of which is hereby incorporated by reference.

TECHNICAL FIELD

This invention relates to a technology for grouping users based on wireless ID information acquired by a user's wireless ID management apparatus.

BACKGROUND ART

Generally, an RFID (Radio Frequency Identification) tag is an ultra small recording apparatus having an antenna and a transmitter and receiver, wherein information that enables identification of a product or a piece of work having an RFID tag on it is recorded in a memory. The RFID tag transmits information in the memory to an RFID reader's antenna by actively generating electromotive force through emitting electric waves in itself or by passively generating electromotive force through receiving electric waves for readout from the RFID reader.

In recent years, standardization of information to be stored in an RFID tag has been promoted by various organizations. For example, in the standard technology of an organization named EPC Global, use of RFIDs is assumed in their basic system. An RFID tag stores a code called EPC, which is read out by an RFID reader. The RFID reader is made to be capable of acquiring EPC-related information by communicating with an ONS (Object Name Service) server on a decentralized network or a PML (Physical Markup Language) server through passing EPC to a middleware called Savant. EPC includes a header, EPC manager, object class, and serial number, and based on these pieces of information, enables identification of a product or a piece of work having an RFID on it in which the corresponding EPC is stored.

As outlined above, since an RFID enables identification of a product or piece of work based on minimal information and then acquisition of related information from a server via a network, its use is anticipated in various areas, such as manufacturing lines and delivery systems, and various applications of RFIDs have been proposed accordingly.

For example, the patent literature 1 discloses a website search service, which, through a simple operation, enables access to websites offering related product information by reading out an RFID using an RFID reader. The patent literature 2 discloses a mobile terminal that provides information, such as an advertisement, in animated image or voice, when an RFID tag that is attached to a poster or the like is read out using an RFID reader. The patent literature 3 discloses a device that provides information on an exhibited item in display or voice output when an RFID tag that is attached to an item exhibited at an exhibition or the like is read out using the device.

Further, the patent literature 4 discloses a contents management system for managing numerous contents accumulated in a plurality of devices and providing a user with a clue or a visual guidepost to lead the user to their desired content.

[Patent literature 1] Japanese Patent Laid-Open Publication No. 2001-350782
[Patent literature 2] Japanese Patent Laid-Open Publication No. 2002-268593
[Patent literature 3] Japanese Patent Laid-Open Publication No. 2003-347991
[Patent literature 4] Japanese Patent Laid-Open Publication No. 2006-107020

The main purpose of every conventionally-proposed RFID application, however, is to have a user read out an RFID tag of a product on the spot and provide the user with related information. Neither equipment for acquiring and recording RFID information for long periods, regarding products which a user is not contemplating or products in the vicinity about which a user is unaware, nor equipment or a system for searching for information based on previously acquired RFID aggregates at a location where the corresponding products can no longer be found in the vicinity and at an arbitrary point of time have been proposed. Further, no systems have been offered, which are to group users by comparing the RFID information, which was collected by a plurality of users using their individual RFID management apparatus, of the users.

The present invention has been developed in view of the foregoing problems, and a general purpose thereof is to offer a technology to enable grouping of users based on the wireless ID information collected by the users.

SUMMARY OF THE INVENTION

To solve the foregoing problems, a user grouping apparatus according to one embodiment of the present invention includes: a storage which stores a wireless ID aggregate structure, which is an aggregated data structure of a plurality of wireless IDs set up for each wireless management apparatus used by a user, in which each wireless ID is associated with a location and time, where and when the corresponding wireless ID was read out from a wireless ID tag by a wireless ID management apparatus, and wireless ID related information which is information associated with the corresponding wireless ID, hierarchically constructed by classifying the plurality of wireless IDs based on the readout location and further by classifying them based on the readout time; an evaluator which evaluates the proximity between a first user's wireless ID aggregate and a second user's wireless ID aggregate; and a classifier which classifies the first user and the second user in one group when the proximity is smaller than a predetermined threshold value.

Another embodiment of the present invention is a user grouping method. This method includes the steps of: reading out from a storage apparatus a wireless ID aggregate structure, which is an aggregated data structure of a plurality of wireless IDs set up for each wireless management apparatus used by a user, in which each wireless ID is associated with a location and time, where and when the corresponding wireless ID was read out from a wireless ID tag by a wireless ID management apparatus, and wireless ID related information which is information associated with the corresponding wireless ID, hierarchically constructed by classifying the plurality of wireless IDs based on the readout location and further by classifying them based on the readout time; evaluating the proximity between a first user's wireless ID aggregate and a second user's wireless ID aggregate; and classifying the first user and the second user in one group when the proximity is smaller than a predetermined threshold value.

It should be appreciated that any combinations of the foregoing components, and any conversions of expressions of the present invention from/into methods, apparatus, systems, computer programs, data structures, recording media, and the like are also intended to constitute applicable aspects of the present invention.

According to the present invention, it is possible to group users in an appropriate manner based on the wireless ID information acquired by the users.

BRIEF DESCRIPTION OF THE DRAWINGS

FIG. 5 is a diagram for illustrating and explaining a program which is executed in the RFID management apparatus of FIG. 4;

FIG. 8 is a diagram for illustrating and explaining a program for updating attribute information of the RFID tag of FIG. 5;

DESCRIPTION OF REFERENCE NUMERALS

10 processor, 12 I/O controller, 14 graphics processor, 16 memory, 18 display, 20 RFID reader, 22 communication I/F, 24 location sensor, 26 input device, 28 clock, 30 RFID reader, 32 time information acquirer, 34 location information acquirer, 36 communicator, 38 classifier, 40 RFID aggregate storage, 42 user interface, 44 searcher, 46 feature space setter, 48 virtual space generator, 50 display controller, 52 matching processor, 54 user preference storage, 56 notifier, 60 receiver, 62 first extractor, 64 RFID aggregate generator, 66 RFID aggregate storage, 68 document file creator, 70 second extractor, 72 description setter, 74 transmitter, 80 proximity evaluator, 82 user classifier, 84 advertisement deliverer, 86 RFID aggregate storage, 88 user database, 90 advertisement database, 100 RFID management apparatus, 110 RFID tag, 120 wireless access point, 130 network, 140 server, 200 conversion processing apparatus, and 300 user grouping apparatus.

DETAILED DESCRIPTION OF THE INVENTION

Figure 1:
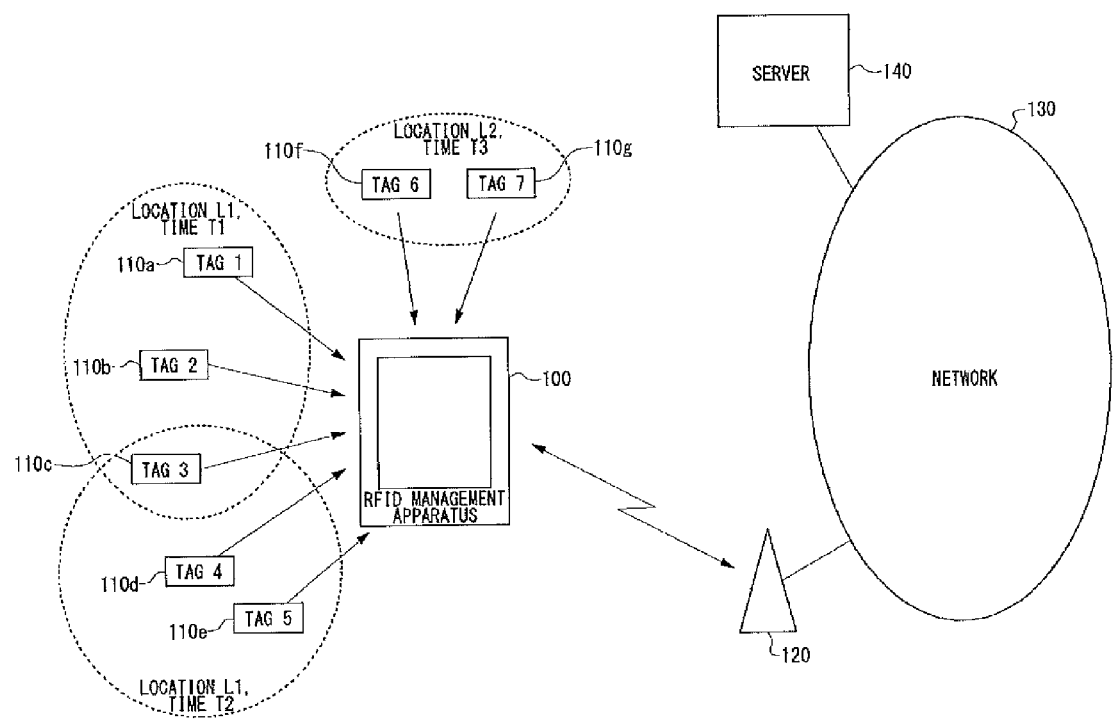
FIG. 1 is a block diagram of an RFID system according to an embodiment.

FIG. 1 is a block diagram of an RFID system according to an embodiment. An RFID management apparatus 100 automatically reads out RFIDs from RFID tags 110a to 110g (when generic reference is made a reference numeral 110 is used) which can be sensed in the vicinity through wireless communication. The RFID management apparatus 100 stores in an embedded memory the RFIDs, which were read out, in association with location information acquired from a location sensor inside the RFID management apparatus 100 and time information acquired from a clock within the RFID management apparatus 100.

RFID tags 1 to 5 (reference numerals 110a to 110e) are read out at the same location L1, and among these RFID tags 1 to 3 are read out at a time T1 and RFID tags 3 to 5 are read out at a time T2. RFID tags 6 and 7 (reference numerals 110f and 110g) are read out at location L2 at a time T3. Each RFID read out from each RFID tag is stored in the embedded memory of the RFID management apparatus 100 in association with the readout location and readout time. RFID tag 3 is read out at location L1 at two different times: T1 and T2, therefore, the RFID read out from RFID tag 3 is stored in association with location L1 and the two different times: T1 and T2.

The RFID management apparatus 100, through communicating with a wireless access point 120 using a wireless communication I/F, can exchange information by accessing a server 140 via a network 130. The server 140, for example, has a database for managing information related to products associated with an RFID (hereinafter, referred to as "RFID-related information" or "metadata") in association with the RFID. The server 140 may do database-based management of website addresses (URLs (uniform resource locators)) of shops associated with location information. These databases may be set up in a dispersed manner in a plurality of servers.

Figure 2:
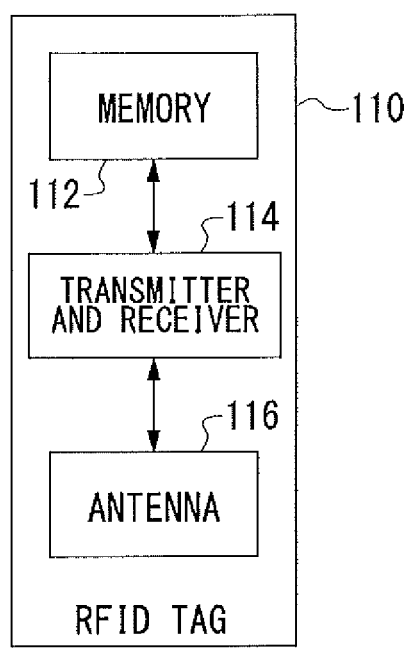
FIG. 2 is a block diagram of the RFID tag of FIG. 1.

FIG. 2 is a block diagram of the RFID tag 110. The RFID tag 110 includes a memory 112, a transmitter and receiver 114, and an antenna 116. The memory 112 stores an RFID. The transmitter and receiver 114 receives a request signal from the RFID management apparatus 100 via the antenna 116 and transmits the RFID stored in the memory 112 to the RFID management apparatus 100.

Figure 3:
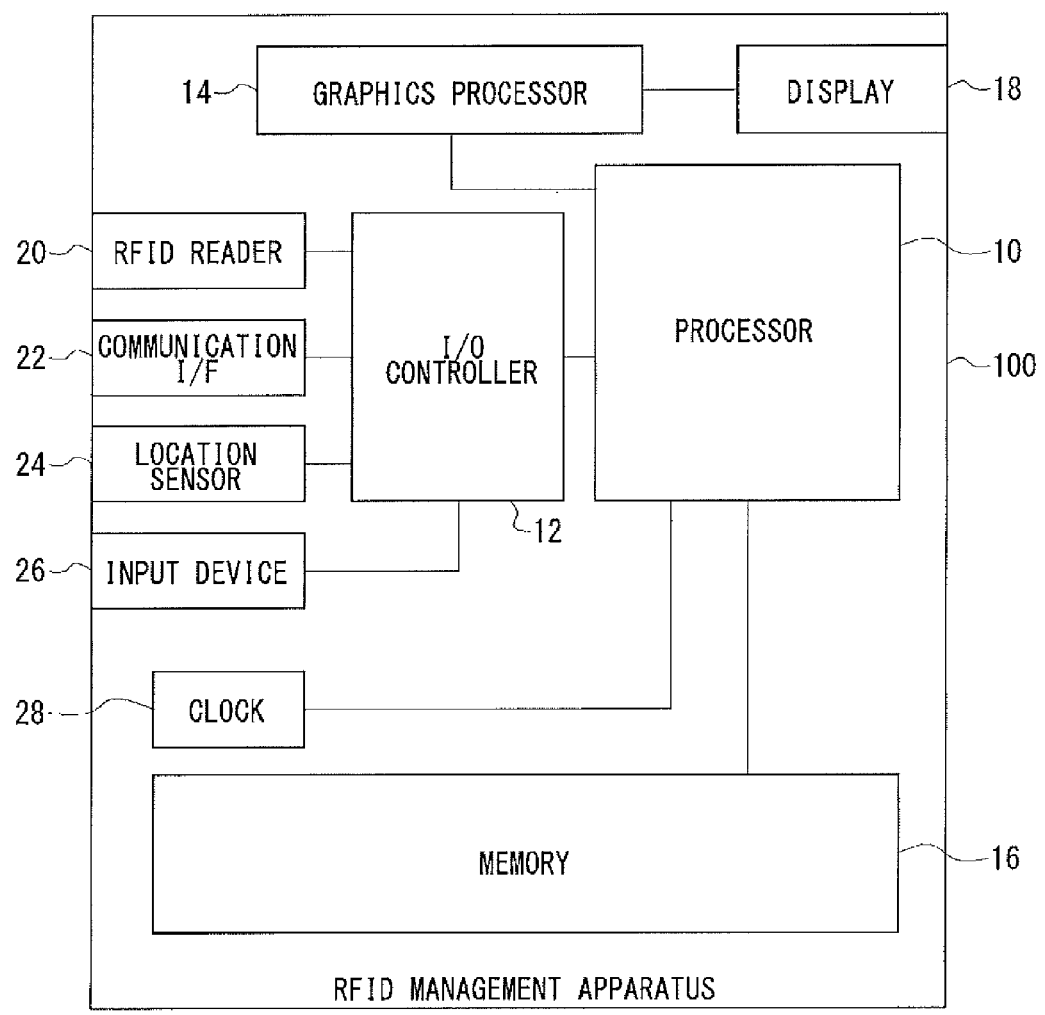
FIG. 3 is a block diagram of the RFID management apparatus of FIG. 1.

FIG. 3 is a block diagram of the RFID management apparatus 100. The RFID management apparatus 100 includes a processor 10, an I/O controller 12, a graphics processor 14, a memory 16, a display 18, an RFID reader 20, a communication I/F 22, a location sensor 24, an input device 26, and a clock 28.

The graphics processor 14 has a display controller function. The communication I/F 22 is an interface for communicating with a wireless base station. The location sensor 24 is, for example, a GPS (Global Positioning System) receiver. The input device 26 is an input device, such as a button or keyboard, for accepting input from a user. The clock 28 enables the processor 10 to have a clock function. It should be appreciated that a D/A converter or speaker for generating sounds, though not being shown in the figure, may also be included. Further, the method for external communication may not be limited to wireless communication but wire communication may also be used, and in such cases, a network interface for making a connection with a wired LAN and the like is included. Moreover, in the case of a mobile phone with an RFID management apparatus function, it is configured to enable communication with a mobile phone base station by using an interface, which meets the mobile phone communications standards, as a communication interface. Furthermore, in the case of a mobile phone, it may be configured so that a location can be specified based on information from a base station in the vicinity, instead of incorporating the location sensor 24.

Figure 4:
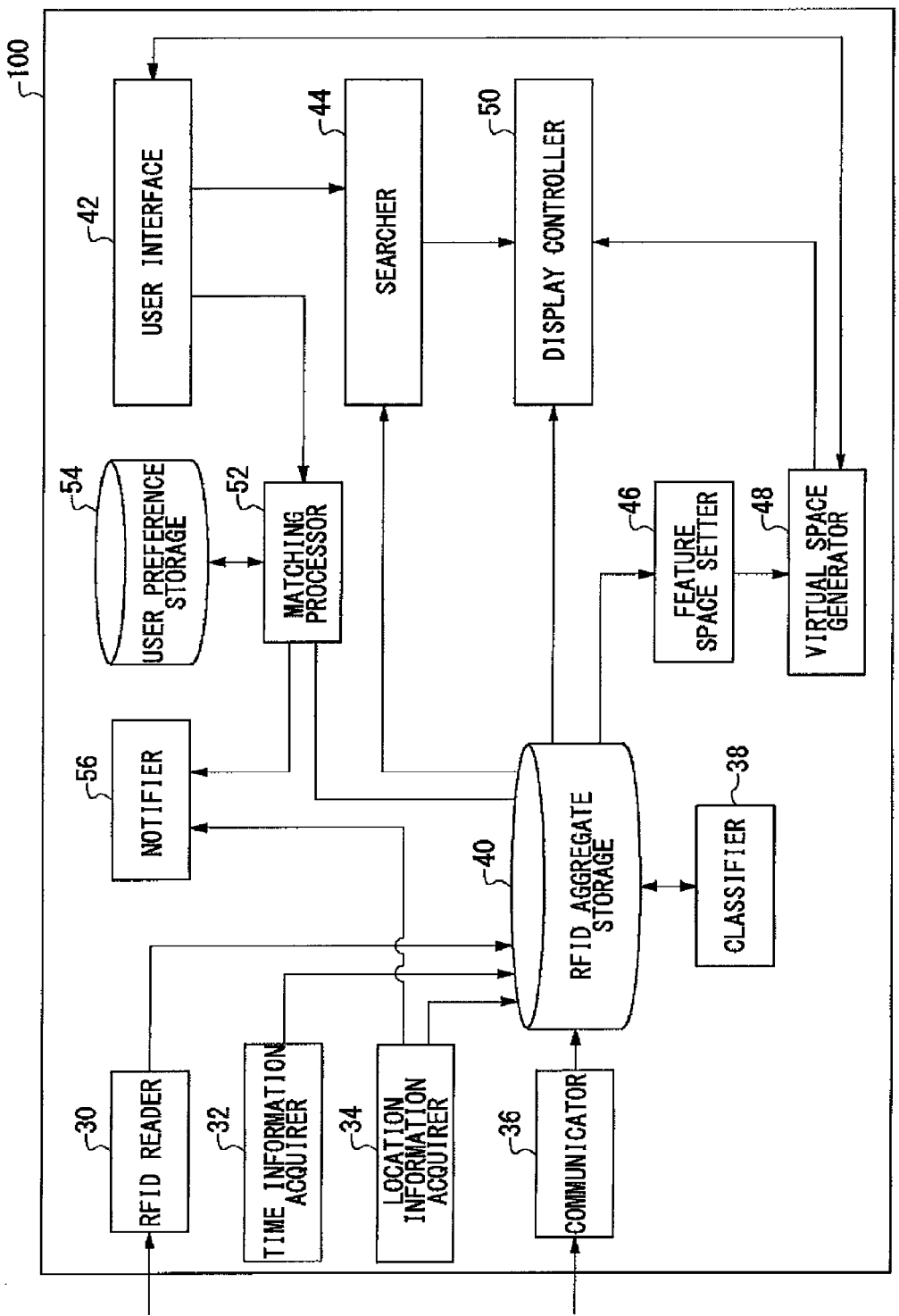
FIG. 4 is a function block diagram of the RFID management apparatus of FIG. 3.

FIG. 4 is a function block diagram of the RFID management apparatus 100. The figure shows a block diagram describing functions. These function blocks may be realized in various forms such as hardware only, software only, or a combination thereof. In other words, at least some of these function blocks may be realized in a hardware configuration of the RFID management apparatus 100 as described in FIG. 3, and function blocks which cannot be realized in a hardware configuration may be realized with the processor 10 executing a program loaded in the memory 16.

An RFID reader 30 is realized in the RFID reader 20 of FIG. 3 to read out an RFID from the RFID tag 110 and store the RFID, which was read out, in an RFID aggregate storage 40. A time information acquirer 32 is realized in the clock 28 of FIG. 3 to store information, which is related to the time and date when the RFID reader 30 read out the RFID from the RFID tag 110, in the RFID aggregate storage 40. A location information acquirer 34 is realized in the location sensor 24 of FIG. 3 to store information, which is related to the location of where the RFID reader 30 read out the RFID from the RFID tag 110, in the RFID aggregate storage 40. The RFID aggregate storage 40 is realized in the memory 16 of FIG. 3 to store the RFID, which was read out by the RFID reader 30, in association with the readout time and the readout location.

A communicator 36 is realized in the communication I/F 22 of FIG. 3. It is connected to a wireless access point 120 to acquire RFID related information, which corresponds to the RFID read out by the RFID reader 30, from a server 140 and store it in the RFID aggregate storage 40 in association with the RFID already stored. A readout of an RFID by the RFID reader 30 and acquisition of RFID-related information by the communicator 36 are done asynchronously. The RFID reader 30 automatically reads out RFIDs from RFID tags in the vicinity and continues to accumulate them in the RFID aggregate storage 40. Conversely, the communicator 36, when connection with the wireless access point 120 is possible, acquires RFID-related information, which corresponds to the RFIDs accumulated in the RFID aggregate storage 40, from the server 140.

A classifier 38, by classifying a plurality of RFIDs stored in the RFID aggregate storage 40 based on the readout location, and further classifying them based on the readout time, hierarchically constructs RFID aggregates and stores the constructed RFID aggregate structure in the RFID aggregate storage 40. RFID-related information is stored within the RFID aggregate structure in association with the constructed RFIDs.

A display controller 50, by displaying the RFIDs, which are stored in the RFID aggregate storage 40, on a display 18, enables viewing of the RFID-related information associated with the displayed RFIDs.

A user interface 42 provides an interface for a user to set conditions for viewing the RFIDs accumulated in the RFID aggregate storage 40. As the conditions for viewing RFIDs, it has the user specify a prescribed distance range and time range from a present location. Further, the user interface 42 may also provide an interface for the user to select attributes of the RFID-related information.

A searcher 44 searches the RFID aggregate structures accumulated in the RFID aggregate storage 40 for RFIDs, which meet the conditions specified by a user, and gives search results to the display controller 50. The display controller 50 displays the search results by the searcher 44 on the display 18 of FIG. 3.

To display RFIDs on the display 18, a virtual space may be used. A feature space setter 46 and a virtual space generator 48 are constituent parts for displaying RFIDs in the virtual space.

The feature space setter 46, in a feature space whose coordinate axis is a feature quantity included in RFID-related information, places one or more RFIDs for viewing in coordinate positions determined based on the respective feature quantities. The virtual space generator 48 places the RFIDs in a virtual space by mapping the RFIDs, which are placed in the feature space, in spots in the virtual space. The virtual space may be either a two-dimensional plane surface or a three-dimensional space. The display controller 50 displays the virtual space in which the RFIDs are placed on the display 18.

The user interface 42 provides a graphical user interface function for a user to search the virtual space displayed on the display 18. The user, while searching the virtual space, by viewing RFID thumbnail images placed in the virtual space and clicking on a thumbnail image, can view the RFID-related information of the corresponding RFID. For example, when products associated with an RFID are clothes, clothes are displayed in thumbnail images, and by clicking on a thumbnail image of the clothes that the user wants to view, it is possible to view the RFID-related information, in this case, information about the clothes, such as manufacturer, colors, sizes, and image data.

The virtual space generator 48 may extract three main elements from a feature space through multivariate analysis and set up a three-dimensional space with the three main elements being its coordinate axes as a virtual space. In such a case, the virtual space generator 48, by calculating the feature quantities of the three main elements for the RFID-related information of each RFID, maps each RFID in a spot in the three-dimensional virtual space.

A user preference storage 54 is realized in the memory 16 of FIG. 3 to store information related to the preferences of a user using the RFID management apparatus 100.

A matching processor 52, by doing matching between feature quantity included in the user preference information stored in the user preference storage 54 and feature quantity included in the RFID-related information of the RFIDs stored in the RFID aggregate storage 40, extracts one or more RFIDs which have RFID-related information matching the user's preference from the RFID aggregate storage 40.

A notifier 56, upon finding that a location where an RFID extracted by the matching processor 52 was read out is within the specified distance range from the present location, gives notification with an alarm that an RFID having RFID-related information matching the user's preference is in the vicinity of the present location. Information related to the present location is acquired by the location information acquirer 34.

Using the present clock time information acquired by the time information acquirer 32, the notifier 56 may also be such that when a location, where an RFID was read out, which was extracted by the matching processor 52, is within the specified distance range from the present location, and the time when the RFID was read out is within the specified time range from the present time, it gives notification that an RFID having RFID-elated information matching the user's preference is in the vicinity of the present location.

When the notifier 56 gives notification that an RFID having RFID-related information, which matches the user's preference, is in the vicinity of the present location, the display controller 50 may display the RFID-related information associated with the RFID on the display 18.

The display controller 50, when displaying RFID-related information on the display 18, may at the same time display map information of the vicinity of the location where an RFID was read out. The map information may be received from the server 140.

The user interface 42, when an article like a product related to an RFID displayed on the display 18 matches a user's preference, may accept a marking from the user. The matching processor 52 may extract feature quantity included in RFID-related information associated with the marked RFID as a feature quantity that characterizes the user's preference and store it in the user preference storage 54 to be used for matching.

FIG. 5 is a diagram for illustrating and explaining a program which is executed in the RFID management apparatus 100. In the present embodiment, the RFID management apparatus 100 is assumed to have a power-on/off function. Further, in the processor 10, it is assumed that a plurality of executable units called threads are executed while scheduling them. In an embodiment, by making the processor 10 of the RFID management apparatus 100 a processor having a plurality of processing elements called a multi-core processor, a plurality of threads may be executed simultaneously in a plurality of processing elements.

When the power is turned on, a program On( ) is executed. To create a thread to execute a program called Scan_Tag( ) for scanning an RFID tag, Create_Thread(Scan_Tag) is executed and a number to identify the thread is assigned to a variable referred to as TagScan for later thread management, so that the thread may be referenced. Further, to enable execution of a program called Update_Tag_Info( ) for updating RFID tag attribute information in parallel with Scan_Tag( ), Create_Thread(Update_Tag_Info) is executed to create one more thread. For this thread also, an identification number for the corresponding thread is assigned to a variable, referred to as TagInfoUpdate, for later reference.

Conversely, when the power is turned off, a program Off( ) is executed. The thread referenced by the TagScan variable created when the power was turned on and the thread referenced by the TagInfoUpdate variable are terminated by Destroy_Thread(TagScan) and Destroy_Thread(TagInfoUpdate).

The Scan_Tag( ) program is executed in the thread which was created when the power was turned on. The ScanTag( ) program, as long as the corresponding thread exists, executes a Get_Tag( ) program and reads out RFIDs by scanning RFID tags in the vicinity. The RFIDs, which were read out, with the location information acquired by the Get_Location( ) program and the present time information acquired by the Get_Time( ) program are recorded as a set in the memory by the Record_Tag (tagID, Loc, Time) program.

It should be appreciated that there are two methods to realize the Get_Tag( ) program: a method in which RFID tags are returned to TagID variable one at a time and a method in which RFIDs read out from all the RFID tags which responded to one scan signal are returned as a set.

Moreover, in the present embodiment, the two programs, Get_Location( ) and Get_Time( ) are called, however, for example, in the case of a GPS, since the acquired data format already includes time information like {<time>, <latitude>, <longitude>, <altitude>}, the clock time which can be acquired from the GPS may be used as the time information. However, since the time interval of data acquisition from the GPS is predetermined by a system, in the case where time information needs to be acquired at shorter intervals, it is more suitable to use clock-based time information generated by a processor, which are acquired by the Get_Time( ) program. Use of either clock time information may be determined according to the specifications of the RFID management apparatus 100.

It should be appreciated that location information returned by the Get_Location( ) is not necessarily information from the GPS as it is. At present, GPS accuracy is around 10 meters, however, it is expected to be around 1 meter in the future. However, whether or not one-meter unit accuracy is necessary will depend on the system design. For example, when a person enters a store and walks around in the store, it may be thought that in terms of location, what's important is which store the person is in, and that what part of the store the person is in is not very important, or in the case of a large store, it may be thought that it is more important to be able to know which section of the store the person is in. Therefore, for the value which the Get_Location( ) program returns, it is desirable that adjusted data be returned in consideration of such design specifications. For Get_Time( ), similarly, the level of time granularity considered appropriate depends on the design specifications. Therefore, generally, it is desirable that data be returned after executing temporal adjustment at the Get_Time( ) program. In other words, the Get_Time( ) program may be set so that it returns the same time value within a specified period of time, such as 10 minutes or 1 hour.

Figure 6:
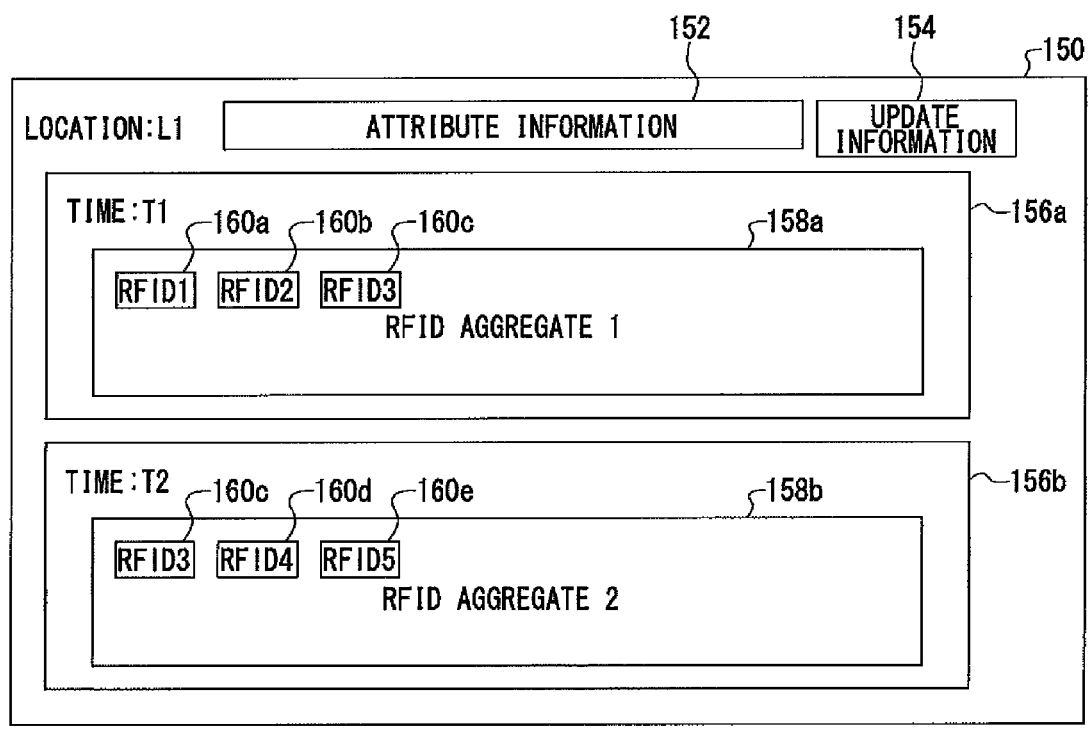
FIG. 6 is a diagram for illustrating and explaining a data structure of an RFID aggregate structure to be stored in the RFID aggregate storage of FIG. 4.

FIG. 6 is a diagram for illustrating and explaining a data structure of an RFID aggregate structure to be stored in the RFID aggregate storage 40. The figure shows an example of a data structure of RFID aggregates created in the memory by the Record_Tag (tagID, Loc, Time) program. An RFID aggregate structure is created for each readout location and managed. One RFID aggregate structure 150 is created for a location L1, in which attribute information 152 associated with the location L1 (for example, the URL of a store associated with the location L1) is stored. An update information 154 is for recording information of the latest updated clock time when the attribute information 152 associated with the location L1 was acquired, and in the case where the updated clock time is prior to the present clock time by a specified time, the attribute information 152 is updated. For example, in the case where the design is such that information is updated on a one day basis, the updated clock time and the present clock time are compared and if the difference is within one day, information update is not done.

In the RFID aggregate structure 150 for each readout location, RFIDs are further classified by readout time. The RFID1 to RFID6, read out from RFID tags 1 to 6 in location L1, as shown in FIG. 1, are classified into two structures, 156a and 156b, according to the readout times T1 and T2, and the RFID1 to RFID3 (reference numerals 160a to 160c) and the RFID3 to RFID5 (reference numerals 160c to 160e) are respectively stored in structures 156a and 156b as an RFID aggregate 1 (reference numeral 158a) and an RFID aggregate 2 (reference numeral 158b).

In other words, there are 5 RFIDs scanned at location L1, RFID1 to RFID5, of which 3 RFIDs, RFID1 to RFID3, are labeled at time T1 and consolidated into the same RFID aggregate 1. Similarly, 3 RFIDs, RFID3 to RFID5, are labeled at the time T2 and consolidated into the same RFID aggregate 2. Here, there are two readout times, T1 and T2, for RFID3, therefore, RFID3 is stored in both RFID aggregate 1 and RFID aggregate 2. It should be appreciated that the RFID-related information of each RFID may be stored in the RFID aggregate structure 150, thus hierarchically constructed, in association with each RFID. RFID-related information may also be separately stored in an association structure consisting of RFIDs and meta information, which will be explained in FIG. 7.

Figure 7:
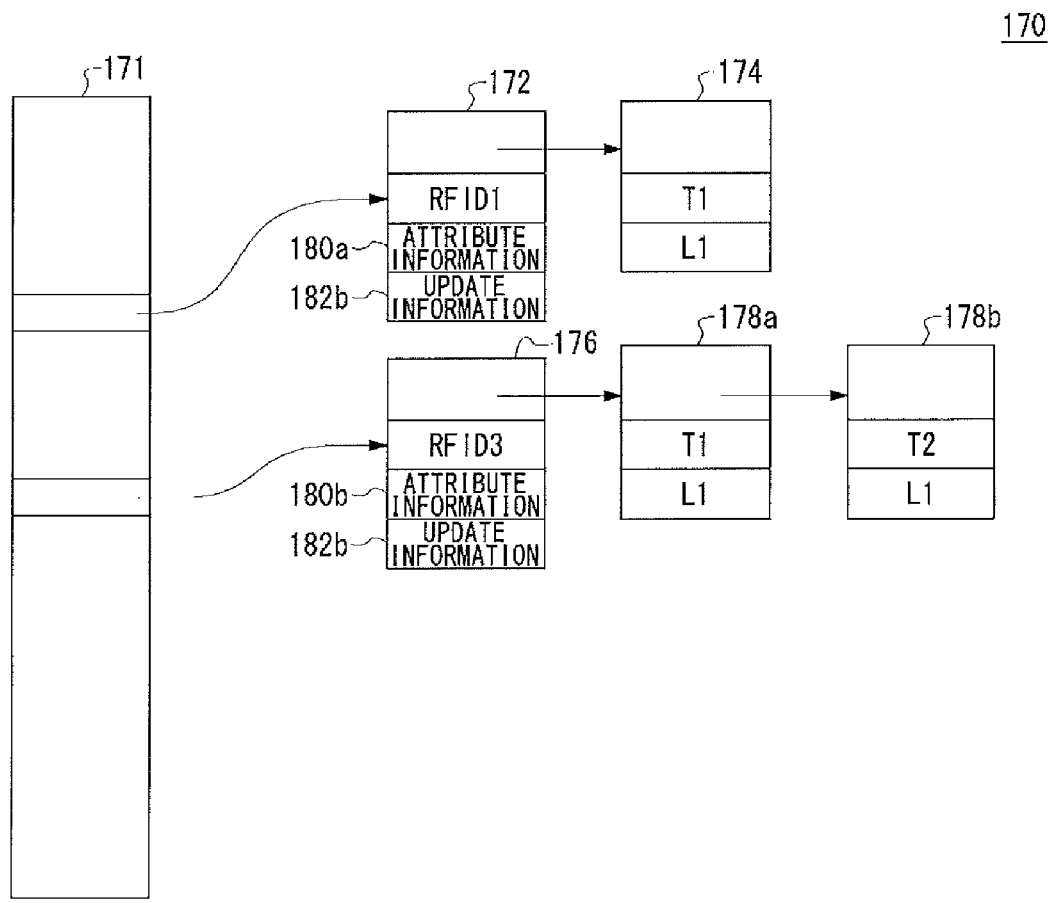
FIG. 7 is a diagram for illustrating and explaining a data structure of an association structure consisting of RFIDs and meta information.

FIG. 7 is a diagram for illustrating and explaining a data structure of an association structure consisting of RFIDs and meta information. A data structure of the association structure 170 is used to manage meta information with respect to each RFID. An alignment or a hash table (reference numeral 171) is set up, which enables a system to reference an arbitrary RFID from the memory.

When a specific RFID, for example, RFID1, is searched for from the table structure of the hash table 171, the value of RFID1, and its attribute information 180a and update information 182a are written in the data structure 172 of RFID1. The attribute information 180a is RFID-related information of RFID1, and the update information 182a is the clock time when the RFID-related information of RFID1 was updated. The data structure 172 for RFID1 has a link for managing the readout time/location pair of the RFID1 as a list. Here, a data structure 174 consisting of the readout time T1 and the readout location L1, as a pair, is linked to the data structure 172 for RFID1.

Similarly, in the data structure 176, for RFID3, the value of RFID3, and its attribute information 180b and update information 182b are written. To the data structure 176 for RFID3, with a readout time/location pair of the RFID3 as a list, a data structure 178a consisting of the readout time T1 and readout time L1, as a pair, and a data structure 178b consisting of the readout time T2 and readout location L1, as a pair, are linked.

There are various options regarding a data management structure, and it goes without saying that the option to be selected may be varied by design specifications. Whatever the case may be, to facilitate management by the RFID management apparatus 100, a plurality of RFID aggregates are hierarchically constructed based on the readout location and the readout time, which are recorded in the memory in a form that enables RFID-related information to be collectively managed in the RFID aggregates.

FIG. 8 is a diagram for illustrating and explaining an Update_Tag_Info( ) program for updating the attribute information of the RFID tag of FIG. 5. This program constantly tries to make a connection to the server 140 via the wireless access point 120, and in the case where a connection is successfully made, executes from a server referenced by a ch variable a Get_Metadata_For_Tags(ch) which is a program for acquiring RFID-related information and a Get_Metadata_For_Locations(ch) which is a program for acquiring readout location related information. By executing these programs, attribute information of RFIDs, which need to be updated, or readout location-related attribute information, as explained in FIGS. 6 and 7, are acquired from the server 140 and stored in a data structure.

Figure 9:
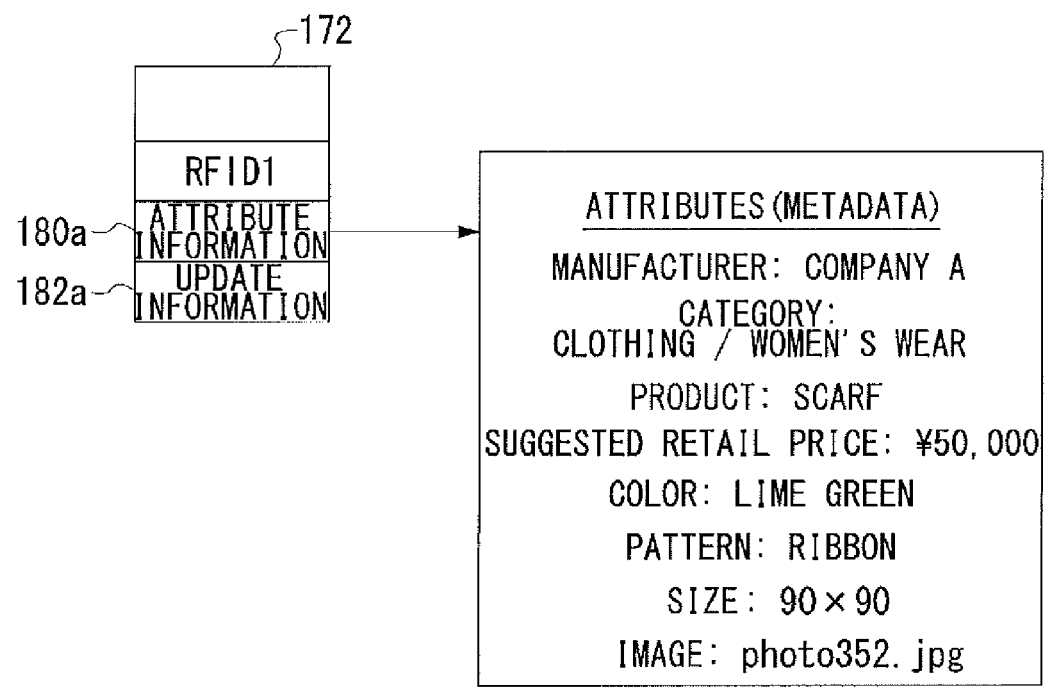
FIG. 9 is a diagram for illustrating and explaining RFID-related information acquired through executing the program for acquiring RFID-related information of FIG. 8.

FIG. 9 is a diagram for illustrating and explaining the RFID-related information acquired through executing the Get_Metadata_For_Tags(ch) program for acquiring RFID-related information of FIG. 8. As attribute information 170a of the data structure 162 of RFID1, attribute information to be identified by RFID1, such as product manufacturer, category, price, color, pattern, size, and image, is recorded.

Up to this point, as a function of the RFID management apparatus 100, an RFID collection function to automatically detect RFID tags in the vicinity and record RFIDs read from the RFID tags has been described. The RFID management apparatus 100, in addition to the function to collect RFIDs, has an RFID information display function and a navigation function. Referring to FIGS. 10 to 14, the RFID information viewer navigation function will now be explained below.

Figure 10A:
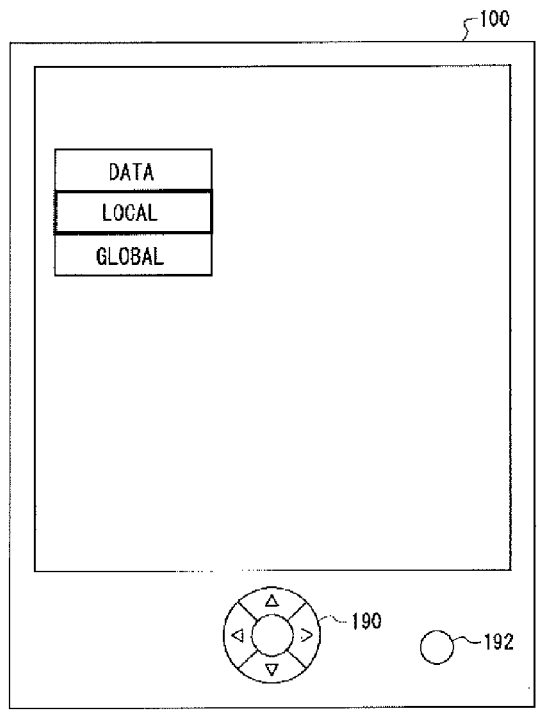
FIGS. 10A and 10B are diagrams for illustrating and explaining a menu to enable a user to select a location where RFID information is recorded.
Figure 10B:
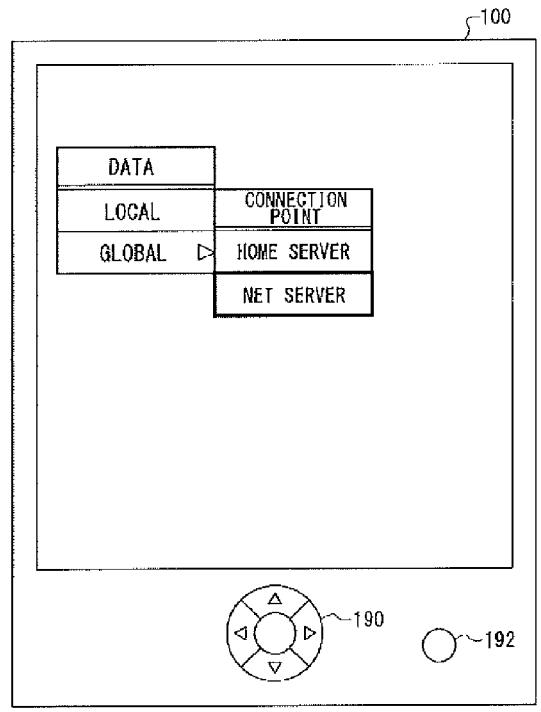

FIGS. 10A and 10B are diagrams for illustrating and explaining a menu to enable a user to select a location where RFID information is recorded. In FIG. 10A, a menu is displayed on the screen of the RFID management apparatus 100, which enables a user to select RFID information to view from between RFID information recorded in the memory of the RFID management apparatus 100 (in other words, "Local") and RFID information recorded in a server's database (in other words, "Global"). The user selects an option using an arrow key 190. In FIG. 10A, "Local" is selected.

As shown in FIG. 10B, when "Global" is selected, another menu appears on the screen, which enables the user to select a server from between a home server on a home network and a net server on the Internet. FIG. 10B shows that the user is selecting "Net server" as a connection point.

It should be appreciated that while a case of selecting a navigation range by using a menu has been described above as an example, a mechanical means may also be used for selecting a navigation range, such as an external switch on the RFID management apparatus 100. Further, the menu to be displayed on the display may appear on the initial screen upon activating the RFID management apparatus 100 by pressing a power button 182.

Figure 11A:
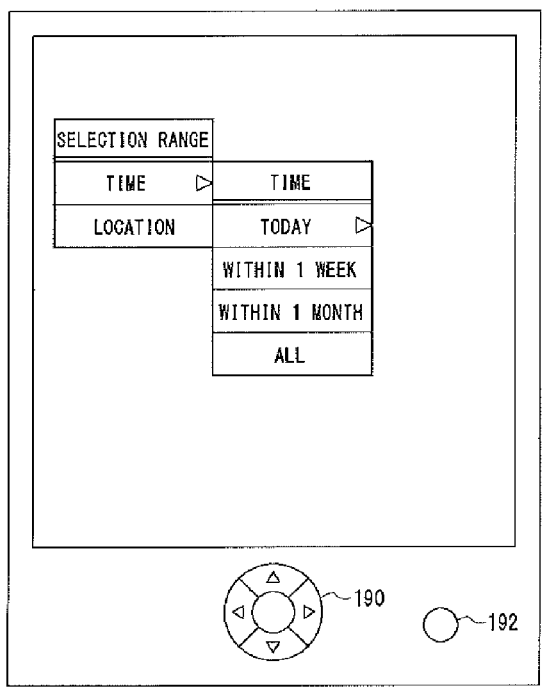
FIGS. 11A and 11B are diagrams for illustrating and explaining a menu to enable a user to select a filtering condition for RFIDs for navigation.
Figure 11B:
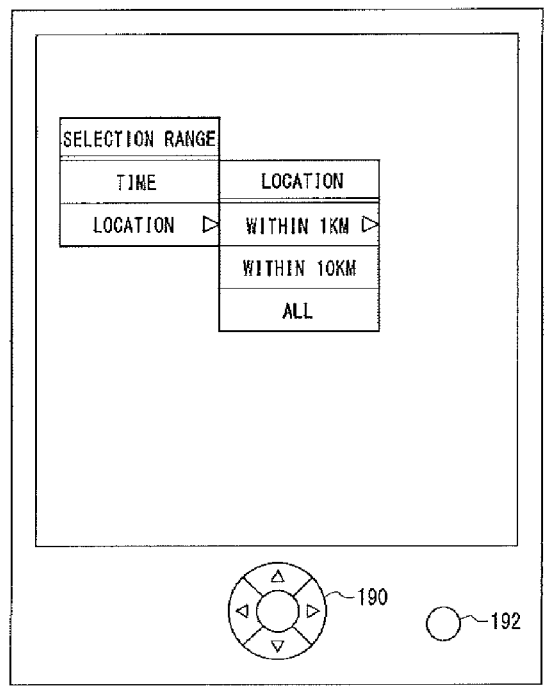

FIGS. 11A and 11B are diagrams for illustrating and explaining a menu to enable a user to select a filtering condition for RFIDs for navigation. As shown in FIG. 11A, a menu appears, for enabling a user to select either "Time" or "Location" to filter RFIDs. When "Time" is selected, another menu appears, for enabling the user to select one condition from among "Today," "Within 1 Week," "Within 1 Month," and "All." Here, the user is selecting "Today." This narrows down the range of the RFID-related information for navigation to RFIDs read out today.

FIG. 11B shows a menu, which appears when "Location" is selected, for enabling the user to further select one condition from among "Within 1 km," "Within 10 km," and "All." Here, the user is selecting "Within 1 km." This narrows down the range of the RFID-related information for navigation to RFIDs read out within a one-kilometer radius with the center being the current location acquired from the location sensor 24.

Figure 12:
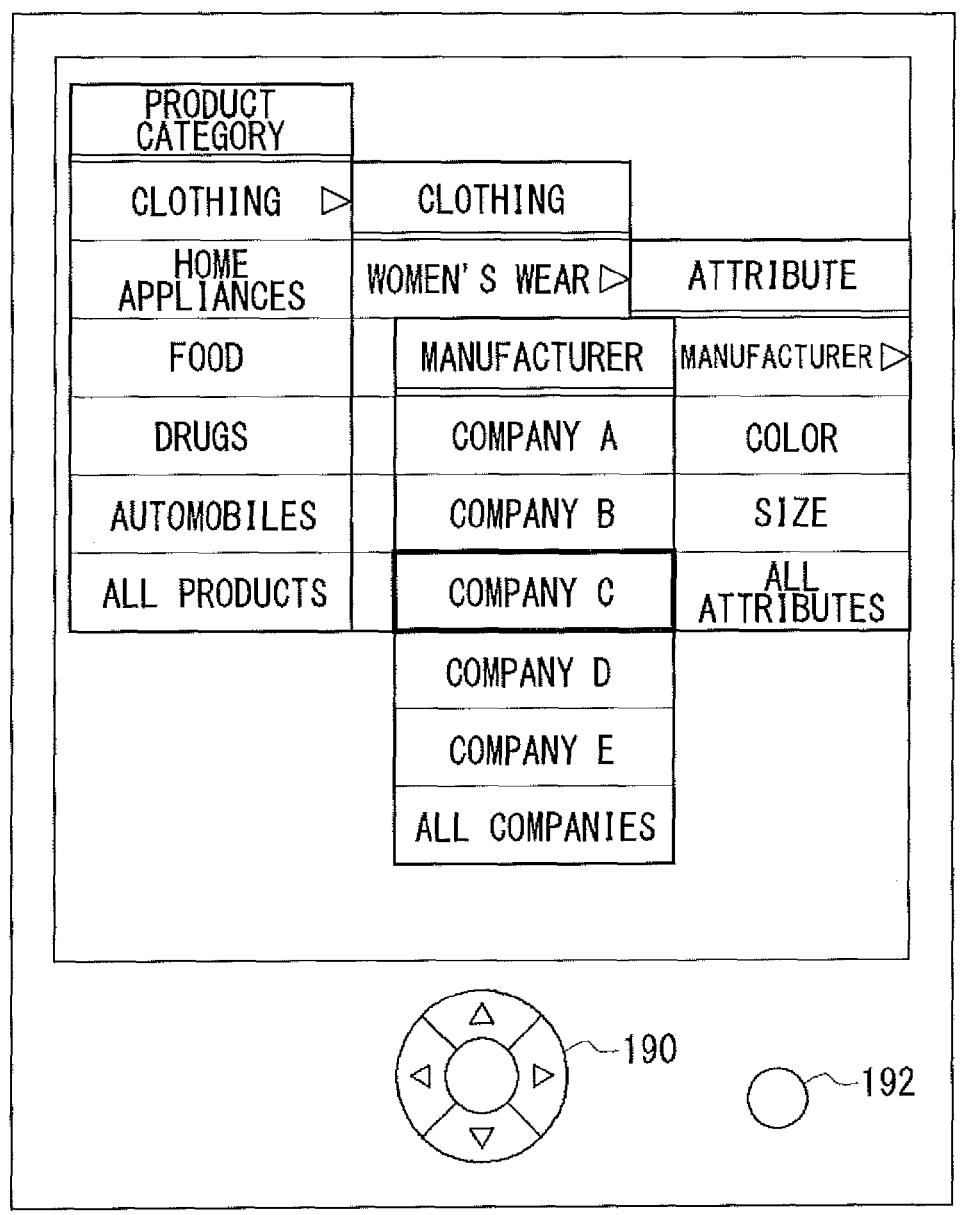
FIG. 12 is a diagram for showing filtering of RFIDs for navigation using RFID-related information.

FIG. 12 is a diagram for showing filtering of RFIDs for navigation using RFID-related information. Here, by using RFID-related information, search refinement is done to determine navigation target items like selecting "Clothing" for product category, "Women's wear" for clothing, "Manufacturer" for attribute of women's wear, "Company C" for manufacturer.

A navigation space where RFIDs for navigation are placed is generated in the following manner. Using the readout location based RFID aggregate structure 150 explained in FIG. 6 and the association structure 170 consisting of RFIDs and meta information explained in FIG. 7, RFID-related information in an RFID aggregate which meets the filtering conditions on readout location, readout time or the like is extracted. Using the feature quantity included in the extracted RFID-related information, a feature space is generated and RFIDs are placed in the feature space. By converting the feature space, in which the RFIDs are placed, into a 3D space by multivariate analysis, a navigation space is generated, in which the RFIDs are placed. To generate a navigation space by multivariate analysis, the method stated in Japanese Patent Application No. 2005-357026 by the applicant for the present application may be used.

A method for generating a navigation space by multivariate analysis will be explained. Extract N pieces of feature quantities characterizing the RFID-related information (metadata) of an RFID. For example, when an RFID associated product is music, from metadata, read out information, such as singer, genre, tempo, and nationality, as feature quantities and convert each feature quantity into a numerical value. By expressing a plurality of feature quantities, which have been converted into numerical values, as a vector, calculate the feature vector of the meta information.

For example, consider that as a feature quantity of a music title, genre and nationality included in the metadata are used. Assume that the genre may be either classic, jazz, or rock, and the nationality may be either Asia, Europe, or America. As a feature vector of the music title, prepare a 6-bit binary vector. When the genre is classic, assign 1 to the first bit; when the genre is jazz, assign 1 to the second bit; and when the genre is rock, assign 1 to the third bit. When the artist's nationality is Asia, assign 1 to the fourth bit; when the artist's nationality is Europe, assign 1 to the fifth bit, and when the artist's nationality is America, assign 1 to the sixth bit. This enables, for example, a case of a jazz music title, which is played by an American, to be expressed by the feature vector (0, 1, 0, 0, 0, 1).

Further, a music feature vector may be determined by preparing several candidate keywords, assigning a binary vector to each keyword, and adding up the binary vectors of all the keywords included for the music title.

Based on the information of an N-dimensional feature vector of the metadata thus determined, set up an N-dimensional feature space with its coordinate axes being the respective N-dimensional feature quantities of the metadata (metadata space), and place the metadata at a coordinate position pointed by the N-dimensional feature vector in the N-dimensional feature space. In other words, the metadata is expressed as a point having an N-dimensional coordinate in the N-dimensional feature space. By generating a feature space (metadata space) based on the RFID-related information of an RFID (metadata) in this way, the RFID may be placed at a point in the metadata space.

By expressing a feature quantity of a user's preference information as a vector, a coordinate system may be moved so that the point pointed at by the user's preference information vector is made to be the origin point of the feature space. By making the point pointed at by the user's preference information vector the origin point, RFID-related information having a feature quantity most similar to the feature quantity of the user's preference information ends up closest to the origin point and RFID-related information having a feature quantity most dissimilar to the feature quantity of the user's preference information ends up farthest away from the origin point.

Multiple pieces of RFID-related information of RFIDs are placed in the N-dimensional feature space, and pieces of RFID-related information having a similar feature form a cluster like a "nebula" in the N-dimensional feature space. Since a space with more than three dimensions cannot be visualized, even if pieces of RFID related information are placed in the N-dimensional feature space, it is not easy for the user to recognize a cluster of RFIDs having a similar feature. Therefore, visualize a cluster of RFIDs having a similar feature by mapping the RFIDs placed in the N-dimensional feature space into a 3D virtual space.

When mapping the RFIDs, which are distributed in the N-dimensional feature space, in the 3D virtual space, do it so that RFIDs which are closely related in the N-dimensional feature space also sit close together, in terms of distance, in the 3D virtual space. In other words, do mapping from the N-dimensional feature space to the 3D virtual space so that the relationship between the RFIDs, in terms of position and distance, is kept as much as possible. For this purpose, multivariate analysis is used. By analyzing the distribution of the RFIDs placed in the N-dimensional feature space by multivariate analysis, taking out three main elements, and defining a 3D virtual space in which the respective elements are the coordinate axes, mapping from the N-dimensional feature space to the 3D virtual space is done. This results in a group of RFIDs which are similar in feature and form a cluster in the N-dimensional feature space also being placed close together in the 3D virtual space.

In particular, as previously mentioned, in the case of a feature space in which a point pointed by a feature vector of a user's preference information is made to be the origin point, by mapping the origin point of the feature space in an initial position for the user's search in a virtual space, the RFID which has the RFID-related information closest to the user's preference is mapped closest to the user's initial position. This enables the user to search the virtual space, starting from RFID-related information that the user is interested in.

Figure 13:
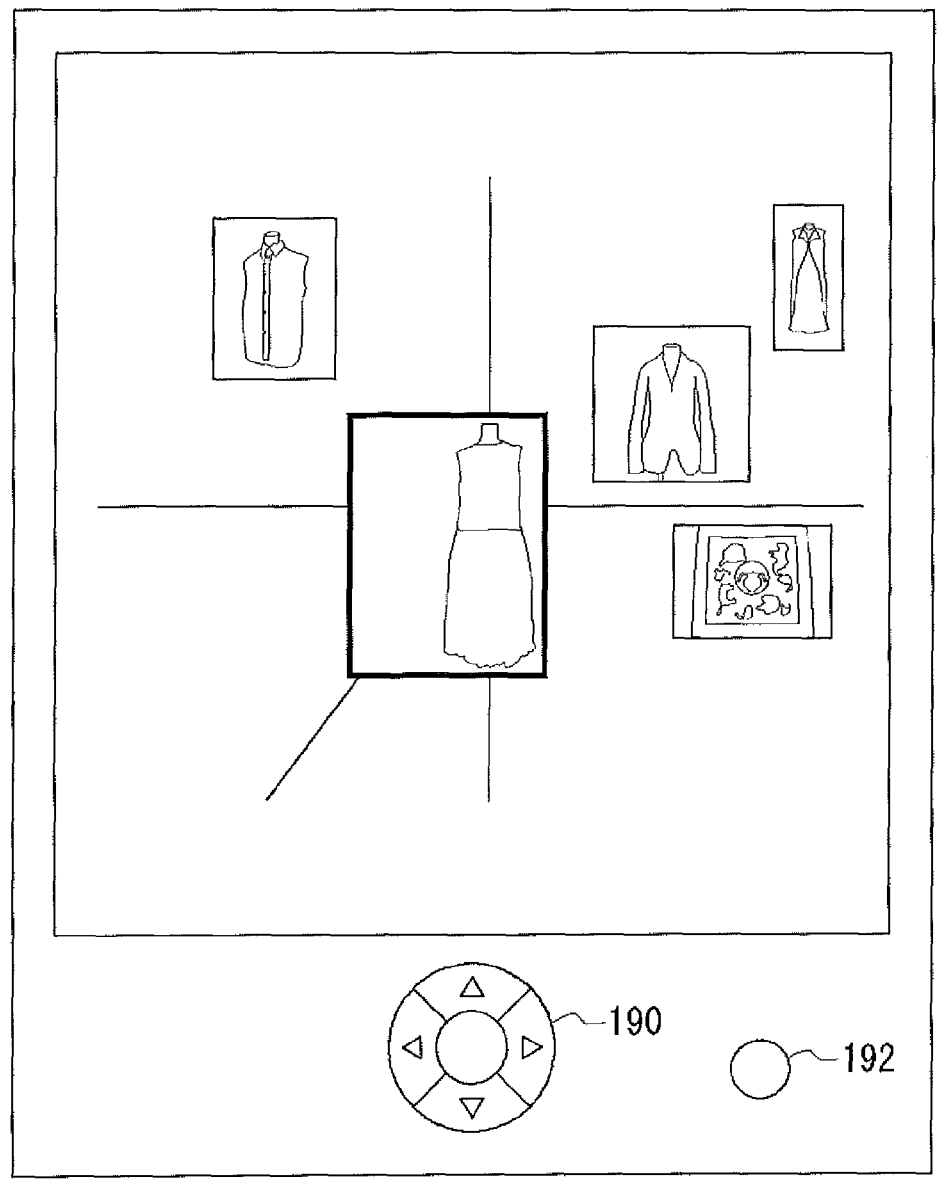
FIG. 13 is a diagram for showing a display example of a navigation space.

FIG. 13 is a diagram for showing a display example of a navigation space. In this embodiment of a navigation system, multivariate analysis is done based on the feature quantity of RFID-related information, and using its results, thumbnail images of the RFID-related information are placed within a 3D space. For a user, the RFID thumbnail image, which is on the frontmost face, automatically becomes an item to view, and by pressing the center button of an arrow key 190, while not being illustrated, related meta information is displayed. Further, using the up, down, left, and right keys of the arrow key 190, the user can move in the 3D space from side to side and up and down, and zoom in by using the center button of the arrow key 190.

Figure 14A:
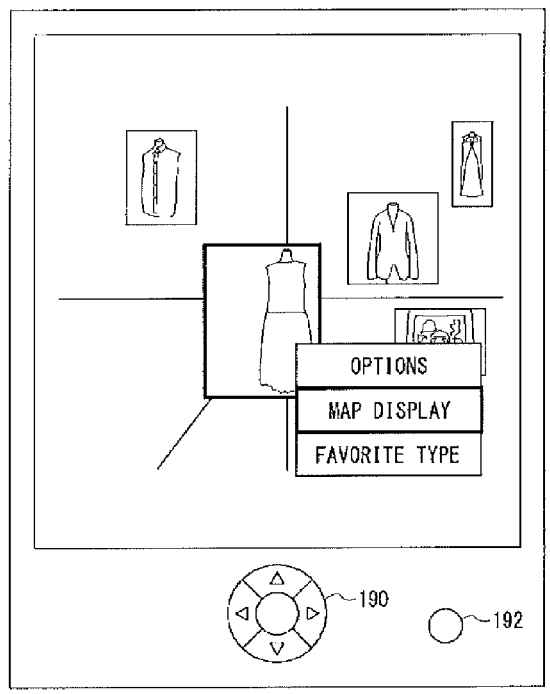
FIGS. 14A and 14B are diagrams for illustrating and explaining an option selection menu displayed in the navigation screen of FIG. 13 for an RFID thumbnail image for viewing.
Figure 14B:
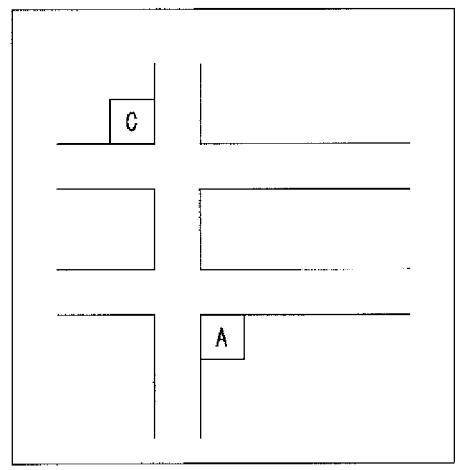

FIG. 14A is a diagram for illustrating and explaining an option selection menu displayed in the navigation screen of FIG. 13 for an RFID thumbnail image for viewing. For the RFID thumbnail image at the front for viewing, if the user holds down the center button of the arrow key 190, a menu pops up to enable the user to select one option from between "Map display" and "Favorite type." If "Map display" is selected in the option selection menu, as shown in FIG. 14B, a map showing the proximity of the locations, where the RFID for viewing was read out, is displayed on the screen, and on the map, the locations of shops A and C are indicated. Shops A and C are the locations, where the RFID for viewing was read out, and on the map, the user can verify the shops where products associated with the RFID selected in the navigation space may be purchased.

Figures 15A, 15B:
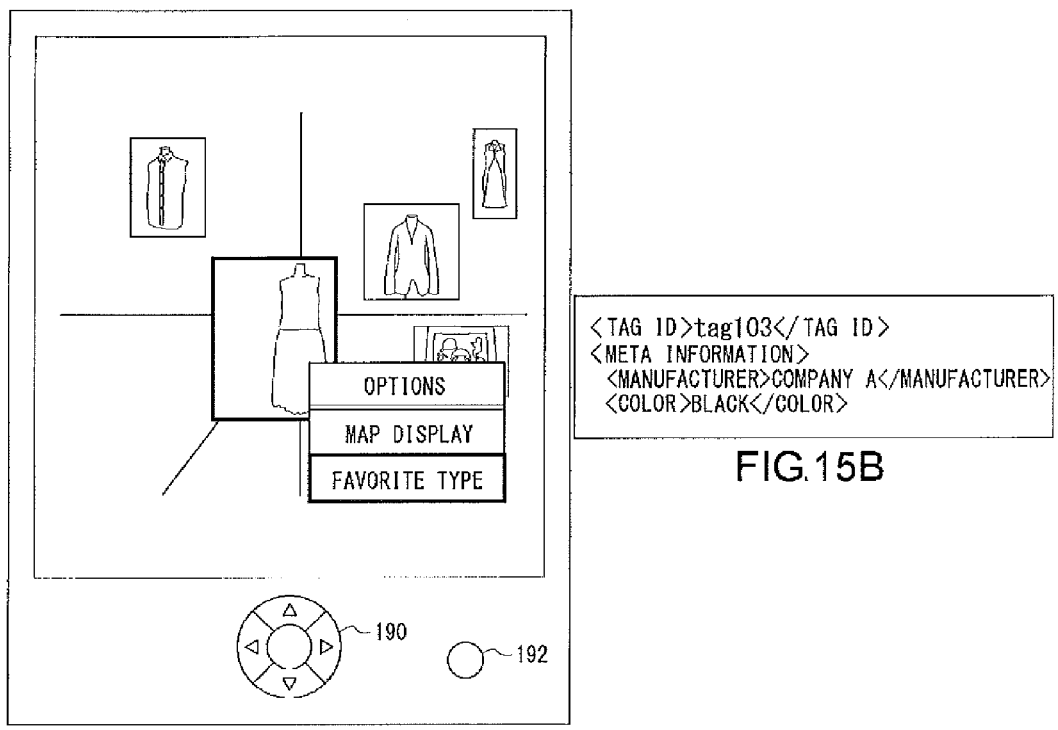
FIGS. 15A and 15B are diagrams for illustrating and explaining an option selection menu displayed in the navigation screen of FIG. 13 for an RFID thumbnail image for viewing.

FIG. 15A is a diagram for illustrating and explaining an option selection menu displayed in the navigation screen of FIG. 13 for an RFID thumbnail image for viewing. The figure describes a case where the user selected "Favorite type" as an option and did "marking." In such cases, from the RFID-related information of the RFID for viewing as shown in FIG.

15B, product attributes are extracted and recorded in the user preference storage 54 as a feature quantity indicating the user's preference. In the example in FIG. 15B, attributes like <manufacturer> being "Company A" and <color> being "black" are registered as the user's preference information.

In another embodiment, by statistically analyzing attribute information related to places visited in a defined recent period (for example, one year) or attribute information of RFIDs which are stored, it is possible to assume certain attributes are highly preferred by a user. For example, if the user frequently visits stores handling many products with blackish design in general, the user is deemed to have a preference for the attribute "black."

Figure 16:
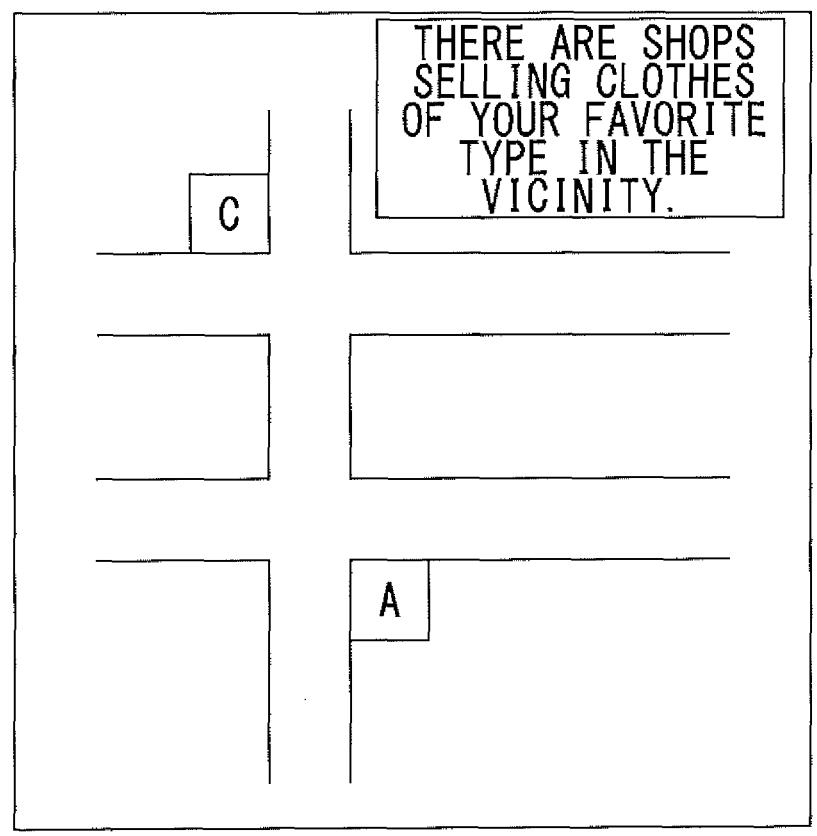
FIG. 16 is a diagram for illustrating and explaining an alarm notification screen using user preference information.

The RFID management apparatus 100 has a function to activate an alarm by sound or a screen display when a product of a user's type is in the vicinity. FIG. 16 is a diagram for illustrating and explaining an alarm notification screen using user preference information. When an RFID having RFID-related information consistent with the user preference information is in the vicinity of the present location (in other words, if the RFID was previously detected in the vicinity of the present location, or when an RFID is detected at this immediate time in the vicinity of the present location), an alarm sounds and a message "There is a shop selling clothes of your type in the vicinity" appears on the screen together with a map showing the location of the shop.

For example, when an RFID "tag103" having RFID-related information consistent with the user preference information is at shop A and shop C, and the RFID management apparatus 100 is brought to a location close to shop A or shop C (for example, within 1 km), the RFID management apparatus 100 gives notification to the user with an alarm sound. The notification method may be changed according to the distance between the RFID management apparatus 100 and the location of the RFID. For example, an implementation may be more desirable, in which the RFID management apparatus 100, when brought close enough to an RFID tag so that it can be detected, gives notification with a blinking light, alarm sound etc. that a product of the user's type is in the vicinity, and in other situations, displays a map to guide the user.

The foregoing description has dealt with a navigator viewer function of the RFID management apparatus 100. As was described in FIG. 10A, the navigator viewer function of the RFID management apparatus 100 may be connected to a household home server or a public server and be used to target RFID aggregates within a server. To enable a server to have RFID aggregates, a mechanism is necessary for sharing the RFID information, which was collected and recorded in the RFID management apparatus 100, with other users on the server. Hereinafter, this information sharing system will be described.

Figure 17:
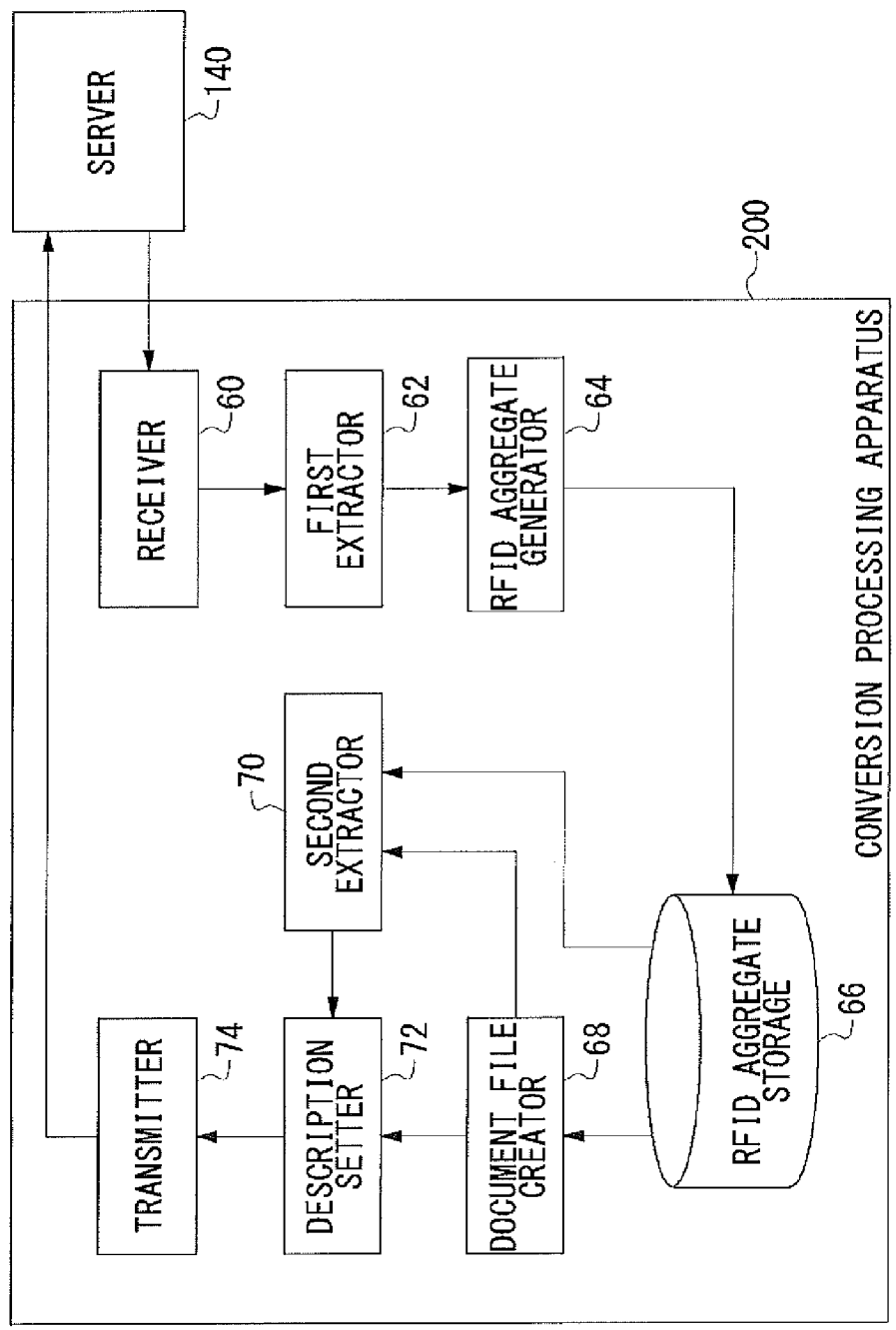
FIG. 17 is a block diagram of a conversion processing apparatus according to an embodiment.

FIG. 17 is a block diagram of a conversion processing apparatus 200 for uploading the RFID data, which was collected and recorded by the RFID management apparatus 100, to the server 140 connected to a network. The conversion processing apparatus 200 may be set up within the RFID management apparatus 100, or it may be realized by a computer to which the RFID management apparatus 100 is connected. In the following description, the conversion processing apparatus 200 shall be implemented in the RFID management apparatus 100.

To upload RFID data, the conversion processing apparatus 200 is connected to the server 140 and requests a start-up of a server program for RFID data uploading on the server 140. Next, the conversion processing apparatus 200 creates and transmits to the server 140 the RFID data collected by the RFID management apparatus 100, a device ID of the RFID management apparatus 100, a URL related to the readout location of the RFID data, and a document file including RFID-related information. The server program operating on the server 140 stores the document file, which was received, in a storage apparatus and makes it viewable from a network.

The configuration of the conversion processing apparatus 200 will be described. A receiver 60 downloads a document file from the server 140. A first extractor 62 extracts RFID aggregates and the readout location and time of each RFID from the received document file, and gives them to an RFID aggregate generator 64. The RFID aggregate generator 64 generates an RFID aggregate structure constructed by the extracted RFIDs based on the readout locations and the readout times and stores it in an RFID aggregate storage 66. The RFID aggregates collected in the RFID management apparatus 100 are already accumulated in the RFID aggregate storage 66, and from the server 140, the RFID aggregates collected by other people are acquired and stored in the RFID aggregate storage 66. This enables the RFID aggregates collected by other people to be added to the RFID aggregates which a user collected on their own.

Consider that in the RFID aggregate storage 66, readout location-based RFID aggregate structures are stored. In each location-based RFID aggregate structure, RFIDs are classified based on the readout times. A document file creator 68 creates readout location-based document files according to the readout location-based RFID aggregate structures stored in the RFID aggregate storage 66.

A second extractor 70 extracts RFID aggregates which were classified based on the readout times, and the readout times which were the basis for the classification from the RFID aggregate structure corresponding to the readout location of the document file created by the document file creator 68, and gives them to a description setter 72.

In the readout location-based document file generated by the document file creator 68, the description setter 72 stores the RFID aggregates extracted by the second extractor 70 based on the readout times. Upon this, RFID-related information included in the RFID aggregates is written in a form viewable via a network. A transmitter 74 uploads the document file in which the RFID-related description is placed by the description setter 72 to the server 140.

The conversion processing apparatus 200 may be partially configured in the server 140. A function for converting an RFID aggregate structure which can be used in the RFID management apparatus 100 into a document file sharable via a network and a function for converting the document file back into an RFID aggregate structure may be realized in the server 140.

Figure 18:
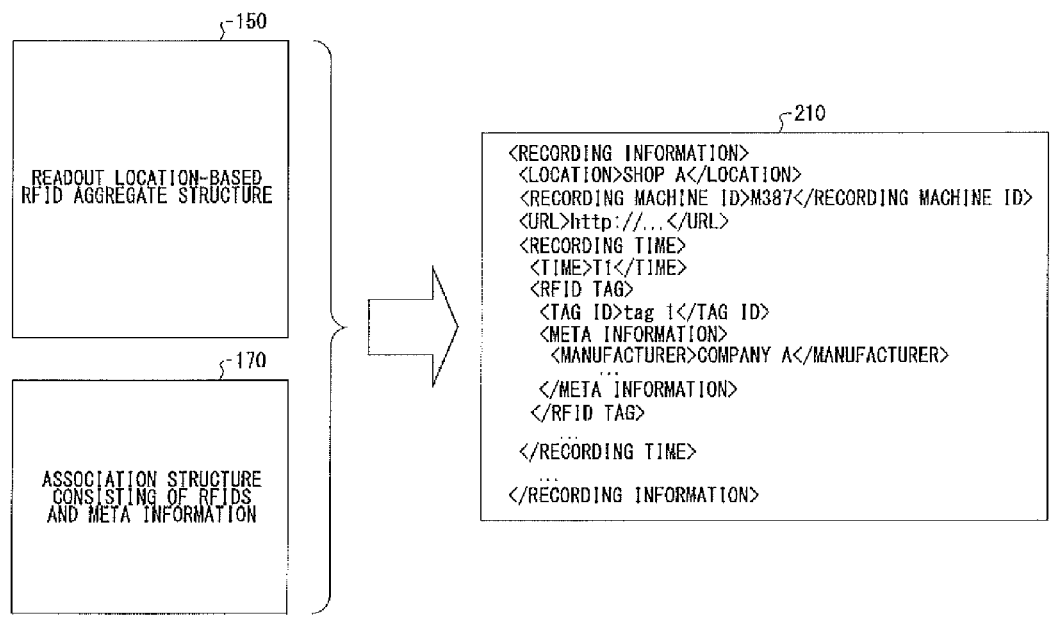
FIG. 18 is a diagram for illustrating and explaining conversion of an RFID aggregate structure into a document file by the conversion processing apparatus of FIG. 17.

FIG. 18 is a diagram for illustrating and explaining conversion of an RFID aggregate structure into a document file by the conversion processing apparatus 200. Using a readout location-based RFID aggregate structure 150 and an association structure 170 consisting of RFIDs and meta information, an XML document 210 is created as an example of a document file. Based on readout location GPS data, a store name and its URL are already acquired as attribute information related to the readout location and described in parts marked with a <location> tag and a <URL> tag in the XML document 210. In a <recording machine ID> tag, the device ID of the RFID management apparatus 100 is written.

In <recording time> tags, <RFID tag> is written in by <time> tag. In this example, data of "tag 1," in other words, a <tag ID> tag and a <meta information> tag are written in the <time> tag "T1" as an <RFID ID tag>. In a <meta information> tag, RFID-related information is described. These pieces of tag data describe the RFID aggregate structure 150 of FIG. 6 in an XML document form.

Thus, by releasing the XML document 210 converted from the RFID aggregate structure 150 over networks, RFID aggregates become viewable for other users. If accesses to the XML document 210 by other users increase, the possibility of shop A's URL stated in the XML document 210 being ranked higher in the keyword search by a word described in the XML document increases, which will result in higher effect of advertising shop A to general users.

It should be appreciated that instead of uploading RFID data to the server 140, RFID data may be uploaded to a home server. In such cases, processing similar to the above mentioned processing may be done by activating a server program on a home server from the RFID management apparatus 100. It should be appreciated that in the server program of a home server, creation and release of an XML document is not always necessary, however, such an operation may be done to enable XML documents accumulated in the home server to be viewable through the RFID management apparatus 100.

Processing when a user selects a net server or a home server as the navigation range on the RFID management apparatus 100 as shown in FIG. 10B will be described. The RFID management apparatus 100 is connected to a server and requests to activate a server program. The server program does filtering according to the requested conditions based on stored XML documents, and converts the XML documents into an RFID aggregate structure form readable by the RFID management apparatus 100. The server program generates a meta data space by multivariate analysis based on the converted RFID aggregate structure, and transmits initial data to be displayed on the RFID management apparatus 100 to the RFID management apparatus 100. When the RFID management apparatus 100 receives the data to be displayed from the server, a display as shown in FIG. 13 appears.

Thereafter, when new data to be displayed is required as a user navigates in the virtual space using the up, down, left, right keys of the arrow key 190, necessary data is requested by transmitting navigation operation information, viewpoint information etc. to the server again. According to the request, the server transmits data deemed to be necessary.

It should be appreciated that conversion processing from an XML document to an RFID aggregate structure and navigation space generation processing by multivariate analysis may be done on the RFID management apparatus 100 side. A data structure of RFID aggregates to be stored in the server 140 may be either an XML document or an RFID aggregate structure usable by the RFID management apparatus 100. In the case where data is stored as an XML document, to generate a metadata space, conversion into an RFID aggregate structure data form is preferable. Conversion processing from an XML document to an RFID aggregate structure is the reverse of the processing shown in FIG. 18.

Further, in the above-mentioned example, a case was simulated, where upon generating an XML document in the server 140, readout location-related URL information and RFID-related information have already been included in the data structure acquired from the RFID management apparatus 100, however, as a matter of course, there is a case where readout location-related URL information and RFID-related attribute information have yet to be received. In such cases, when doing the conversion processing shown in FIG. 18, data must be checked at the server and necessary information be acquired from the appropriate location, and at the same time, processing to write it in the <URL> tag item and the <meta information> tag item must be done.

Figure 19:
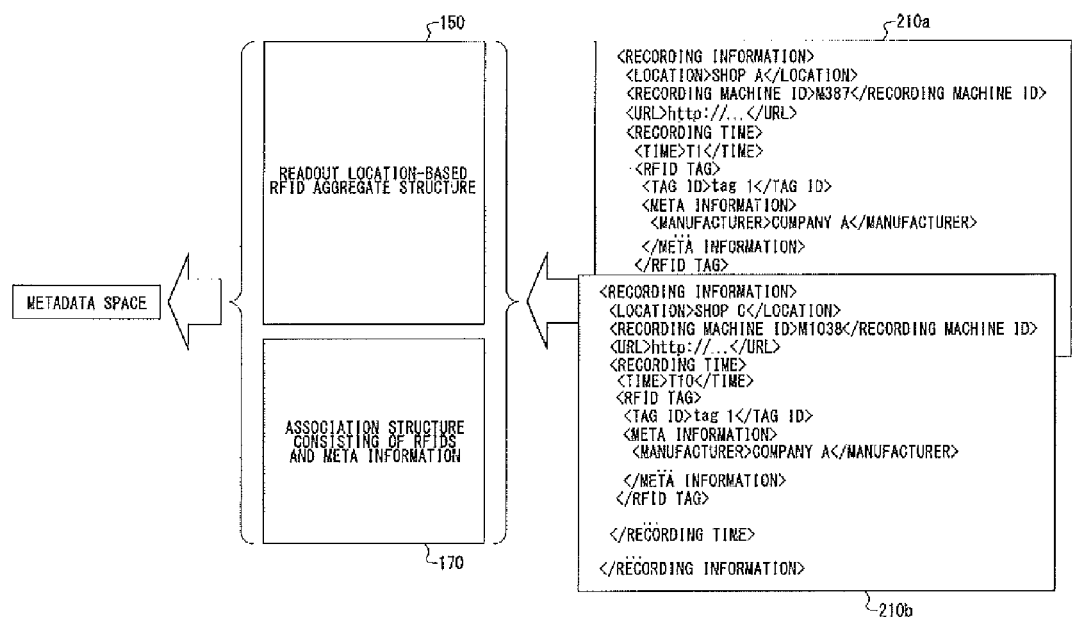
FIG. 19 is a diagram for showing an example of generation of a metadata space through conversion of XML documents registered in a server from a plurality of RFID management apparatuses into data in an RFID management apparatus format.

FIG. 19 is a diagram for showing an example of generation of a metadata space through conversion of XML documents registered in the server 140 from a plurality of RFID management apparatuses into data in an RFID management apparatus format. Two XML documents 210a and 210b were registered by two different RFID management apparatuses, with a <recording machine ID> of "M387" and "M1038," respectively. The two XML documents 210a and 210b both have "tag1" for <tag ID>, but their readout locations are respectively shop A and shop C and their readout times are respectively T1 and T10. Thus, the two XML documents 210a and 210b are different in readout location and readout time. In a metadata space, even two such different pieces of RFID information may be associated with products which have the same RFID. RFID aggregates are organized from the two XML documents 210a and 210b, the readout location-based RFID aggregate structure 150 and the association structure 170 consisting of RFIDs and meta information are generated, and using these pieces of data in the RFID management apparatus format, a metadata space is generated.

In the case where "Net server" is selected in the menu of FIG. 10B, a metadata space is generated from the RFID information registered from the RFID management apparatuses of a plurality of users, and is offered to the RFID management apparatus 100. In the display of the RFID management apparatus 100, the RFID thumbnail images of "tag 1" are displayed for viewing in a navigation space as described in FIG. 14A, and if map display is selected, as shown in FIG. 14B, shop A and shop C, which are the locations where the RFID of "tag 1" was read out, are displayed.

Figure 20:
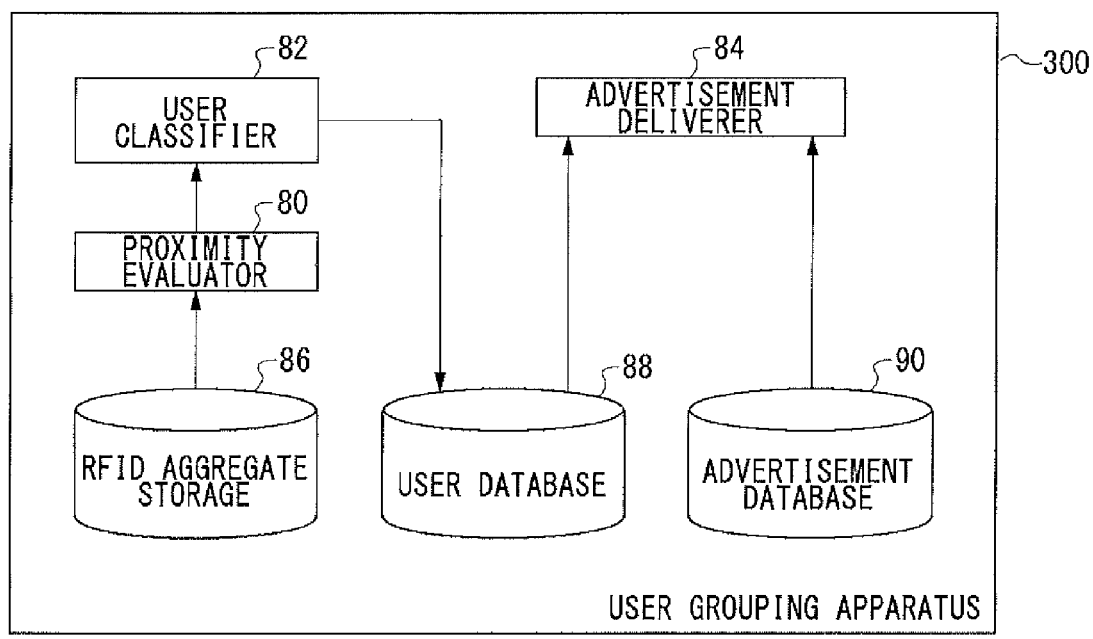
FIG. 20 is a block diagram of a user grouping apparatus according to an embodiment.

FIG. 20 is a block diagram of a user grouping apparatus 300 for making a user group based on user preference information. The user grouping apparatus 300 is realized in a server. An RFID aggregate storage 86 stores RFID aggregates registered by a plurality of users. Each RFID in the RFID aggregates is associated with a readout location, readout time, and RFID-related information. A proximity evaluator 80 evaluates the proximity between the RFID aggregates of a plurality of users.

The proximity evaluator 80 evaluates the proximity between a readout location of a plurality of RFIDs included in the first user's RFID aggregate and a readout location of a plurality of RFIDs included in the second user's RFID aggregate. In the case where there is more than one readout location, a proximity is calculated by comparing the distribution of a plurality of readout locations between users. The proximity evaluator 80 may evaluate a proximity by further comparing the distribution of readout times between users. Even if readout locations are close together, if readout times are significantly different, the first user and the second user may not need to be classified into one group. For example, even between users who visit the same location, it can be thought that those who go out during the daytime and those who go out at night have different preferences.

Further, the proximity evaluator 80 may evaluate the proximity between the feature quantity of multiple pieces of RFID information included in the first user's RFID aggregate and the feature quantity of multiple pieces of RFID information included in the second user's RFID aggregate. For a simple example, a case where two users prefer the same manufacturer is evaluated as a proximity 1 and a case where two users prefer totally different manufacturers is evaluated as a proximity 0. For colors and sizes also, evaluation shall be made based on continuous quantity from proximity 1 to proximity 0. Moreover, by expressing a plurality of feature quantities of RFID related information as vectors, a proximity may be evaluated based on the distance between vectors.

A user classifier 82 groups users by proximity. The user classifier 82 groups two random users in one group when the proximity of the two random users is smaller than a predetermined threshold value. The user classifier 82 adds group information to a user profile stored in a user database 88. An advertisement deliverer 84, for users in the same group, selects an advertisement, which fits the users' preferences, from an advertisement database 90, and delivers it simultaneously to the users in the same group. In addition, as an applicable example of a means of connecting users with similar preferences, use of chat etc. may be considered.

As has been described previously, according to the RFID management apparatus 100 of the present embodiment, it is possible to automatically read out and record RFID tags, which are used to specify products and pieces of work. As well as automatically acquiring RFID tags, the RFID management apparatus 100 records the RFID tags together with the time and location of acquisition, and acquires information related to the RFID tags when connection with a server is possible. This enables systematic management of RFID information.

According to the conversion processing apparatus 200 of the present embodiment, a large amount of RFID information automatically collected by the RFID management apparatus 100 can be converted into a constructed document to be shared online with other people. Further, common constructed documents can be converted in a unified manner into a data structure referable by the RFID management apparatus 100.

According to the RFID management apparatus 100 of the present embodiment, it is possible to offer a navigator function to enable a user to search a space for RFID-related information by filtering a large amount of RFID information, which was automatically collected, based on conditions, such as time and location, and displaying it systematically.

According to the RFID management apparatus 100 of the present embodiment, by enabling a user to search a space in which a large amount of RFID information acquired by the RFID management apparatus 100 is placed and enabling the user to mark their favorite product etc., the user preference information is extracted from RFID-related information. Alternatively, the user preference information is extracted through statistically analyzing the RFID-related information of RFIDs acquired by the user over a defined period. Consequently, attributes highly preferred by the user may be determined and when the user comes close to a location where an RFID having an attribute highly preferred by the user or when the corresponding RFID is detected at the present location, notification can be made to the user by an alarm sound etc.

According to the user grouping apparatus 300 of the present embodiment, by analyzing the large amount of RFID information acquired over a defined period by RFID management apparatuses 100 owned by a plurality of users and evaluating the proximity of the preferences of a plurality of users, the users can be grouped according to the proximity. As well as analyzing the RFID information collected by individual users, by comparing the RFID information respectively collected between a plurality of users and evaluating common points and differences, it is possible to extract users having common preferences, which can be utilized for product advertisement and communication between users.

Up to this point, the present invention has been described in conjunction with the embodiment thereof. It will be understood by those skilled in the art that various modifications may be made to combinations of the foregoing components and processes, and all such modifications are also intended to fall within the scope of the present invention.

The present invention is applicable to the wireless ID management technologies.

What is claimed is:

1. A user grouping apparatus comprising:
   a storage that stores a wireless ID aggregate structure, which is an aggregated data structure of a plurality of wireless IDs set up for each wireless management apparatus used by a user, in which each wireless ID is associated with a location and time, where and when the corresponding wireless ID was read out from a wireless ID tag by a wireless ID management apparatus, and wireless ID related information which is information associated with the corresponding wireless ID, hierarchically constructed by classifying the plurality of wireless IDs based on the readout location and further by classifying them based on the readout time such that: (i) the wireless ID aggregate structure includes a respective set of wireless ID aggregates for each of a plurality of physical locations, (ii) each wireless ID aggregate is for a given time and includes a plurality of wireless IDs of a plurality of users read at such time;
   an evaluator, which extracts one or more feature quantities from wireless ID related information of one or more of the wireless ID aggregates, where the feature quantities are indicative of preferences of one or more of the plurality of users, and which evaluates affinity between a first user's preferences as detected from a first wireless ID aggregate and a second user's preferences as detected from a second wireless ID aggregate;
   a classifier, which classifies the first user and the second user in one group when the affinity is stronger than a predetermined threshold value; and
   a filter, which filters the wireless ID aggregate structure and returns a subset of the wireless ID related information in response to a user request, such that an output screen generator may generate an output screen displaying the subset of the wireless ID related information to the user.

2. The user grouping apparatus according to claim 1, wherein the evaluator, in addition to evaluating the affinity of preferences from respective one or more feature quantities, further evaluates the proximity between the readout locations of a plurality of wireless IDs included in the first user's wireless ID aggregate and the readout locations of a plurality of wireless IDs included in the second user's wireless ID aggregate.

3. The user grouping apparatus according to claim 2, wherein the evaluator further evaluates the proximity between the readout times of a plurality of wireless IDs included in the first user's wireless ID aggregate and the readout times of a plurality of wireless IDs included in the second user's wireless ID aggregate, and
   wherein, if the first user and the second user are classified into one group based on affinity of preferences from respective one or more feature quantities and if the proximity of readout times between the first user and the second user is measured to be farther than a predetermined proximity threshold, the classifier cancels the classification of the first user and the second user into one group.

4. The user grouping apparatus according to claim 1, wherein the evaluator evaluates the affinity between a selected feature quantity of information related to a plurality of wireless IDs included in the first user's wireless ID aggregate that has been chosen by a user and a similar feature quantity of information related to a plurality of wireless IDs included in the second user's wireless ID aggregate.

5. A user grouping method comprising the steps of:
reading out from a storage apparatus a wireless ID aggregate structure, which is an aggregated data structure of a plurality of wireless IDs set up for each wireless management apparatus used by a user, in which each wireless ID is associated with a location and time, where and when the corresponding wireless ID was read out from a wireless ID tag by a wireless ID management apparatus, and wireless ID related information which is information associated with the corresponding wireless ID, hierarchically constructed by classifying the plurality of wireless IDs based on the readout location and further by classifying them based on the readout time such that: (i) the wireless ID aggregate structure includes a respective set of wireless ID aggregates for each of a plurality of physical locations, (ii) each wireless ID aggregate is for a given time and includes a plurality of wireless IDs of a plurality of users read at such time;

extracting one or more feature quantities from wireless ID related information of one or more of the wireless ID aggregates, where the feature quantities are indicative of preferences of one or more of the plurality of users;

evaluating affinity between a first user's preferences as detected from a first wireless ID aggregate and a second user's preferences as detected from a second wireless ID aggregate;

classifying the first user and the second user in one group when the affinity is stronger than a predetermined threshold value;

filtering the wireless ID aggregate structure and returns a subset of the wireless ID related information in response to a user request; and generating an output screen displaying the subset of the wireless ID related information to the user.

6. A user terminal that communicates with a server, the server comprising:

a storage that stores a wireless ID aggregate structure, which is an aggregated data structure of a plurality of wireless IDs set up for each wireless management apparatus used by a user, in which each wireless ID is associated with a location and time, where and when the corresponding wireless ID was read out from a wireless ID tag by a wireless ID management apparatus, and wireless ID related information which is information associated with the corresponding wireless ID, hierarchically constructed by classifying the plurality of wireless IDs based on the readout location and further by classifying them based on the readout time such that: (i) the wireless ID aggregate structure includes a respective set of wireless ID aggregates for each of a plurality of physical locations, (ii) each wireless ID aggregate is for a given time and includes a plurality of wireless IDs of a plurality of users read at such time; and an evaluator, which extracts one or more feature quantities from wireless ID related information of one or more of the wireless ID aggregates, where the feature quantities are indicative of preferences of one or more of the plurality of users, and which evaluates affinity between a first user's preferences as detected from a first wireless ID aggregate and a second user's preferences as detected from a second wireless ID aggregate;

a classifier, which classifies the first user and the second user in one group when the affinity is stronger than a predetermined threshold value and adds group information to a user profile of the first user and the second user; and a filter, which filters the wireless ID aggregate structure and returns a subset of the wireless ID related information in response to a user request, and the user terminal comprising a memory that stores the wireless ID aggregate structure;

a sender that sends the wireless ID aggregate structure to the server;

a receiver that receives from the server the user profile to which the group information is added; and an output screen generator, which generates an output screen displaying the subset of the wireless ID related information to the user.

* * * * *